US011537784B2

(12) United States Patent
Tian et al.

(10) Patent No.: US 11,537,784 B2
(45) **Date of Patent: *Dec. 27, 2022**

(54) COLLABORATIVE IN-LINE CONTENT ITEM ANNOTATIONS

(71) Applicant: Dropbox, Inc., San Francisco, CA (US)

(72) Inventors: Sang Tian, San Francisco, CA (US); Jennifer Wong, San Francisco, CA (US); Walter Somerville, San Francisco, CA (US); Danilo Callejas, Oakland, CA (US); Brian Oh, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 17/359,369

(22) Filed: Jun. 25, 2021

(65) Prior Publication Data

US 2021/0326516 A1 Oct. 21, 2021

Related U.S. Application Data

(63) Continuation of application No. 16/587,729, filed on Sep. 30, 2019, now Pat. No. 11,074,400.

(51) Int. Cl.

| | |
|---|---|
| ***H04L 12/58*** | (2006.01) |
| ***G06F 40/169*** | (2020.01) |
| ***G06F 3/04842*** | (2022.01) |
| ***G06F 3/04817*** | (2022.01) |
| ***G06F 40/103*** | (2020.01) |
| ***G06F 40/186*** | (2020.01) |

(52) U.S. Cl.

CPC ........ *G06F 40/169* (2020.01); *G06F 3/04817* (2013.01); *G06F 3/04842* (2013.01); *G06F 40/103* (2020.01); *G06F 40/186* (2020.01)

(58) Field of Classification Search

CPC ............... G06F 40/169; G06F 3/04817; G06F 3/04842; G06F 40/103; G06F 40/186

See application file for complete search history.

(56) References Cited

U.S. PATENT DOCUMENTS

| | | | | |
|---|---|---|---|---|
| 6,389,434 | B1 * | 5/2002 | Rivette | G06F 16/322 715/209 |
| 7,117,432 | B1 * | 10/2006 | Shanahan | G06F 16/353 715/236 |
| 7,418,656 | B1 | 8/2008 | Petersen | |
| 8,799,765 | B1 | 8/2014 | Macinnis et al. | |
| 9,189,467 | B1 | 11/2015 | Patnoe | |

(Continued)

OTHER PUBLICATIONS

Microsoft, "Add Citations in a Word Document," retrieved from https://support.office.com/enus/article/add-citations-in-a-word-document-ab9322bb-a8d3-47f4-80c863c06779f127, on Sep. 26, 2019, 6 Pages.

(Continued)

*Primary Examiner* — Hassan Mrabi
(74) *Attorney, Agent, or Firm* — Fenwick & West LLP

(57) ABSTRACT

A collaborative content management system is disclosed herein for receiving a command to add an annotation object following a character input into a line of a collaborative content item. The system inserts an annotation object onto the line following the character, detects a selection of the annotation object, and displays a secondary collaborative content item in visual association with the character. The system detects textual content that corresponds to a citation within the secondary collaborative content item, and responsive to detecting the textual content, generates for display a template for inputting fields of a citation. The system receives text entered into one or more of the fields, generates a citation based on the text, and inputs the citation into the secondary collaborative content item.

20 Claims, 13 Drawing Sheets

(56) References Cited

U.S. PATENT DOCUMENTS

| | | | | |
|---|---|---|---|---|
| 9,344,466 | B1 * | 5/2016 | Abuzalaf | H04L 67/52 |
| 9,424,240 | B2 * | 8/2016 | Beezer | G06F 3/0482 |
| 9,524,366 | B1 * | 12/2016 | Watanabe | G06F 30/327 |
| 9,880,989 | B1 * | 1/2018 | Cadabam | G06F 40/151 |
| 10,083,160 | B1 * | 9/2018 | Yu | G06F 3/04855 |
| 10,127,215 | B2 * | 11/2018 | Siwoff | G06T 11/001 |
| 10,462,077 | B2 * | 10/2019 | Cacioppo | H04L 67/06 |
| 10,599,758 | B1 * | 3/2020 | Yu | G06F 40/169 |
| 10,691,877 | B1 * | 6/2020 | Eisner | G06Q 10/101 |
| 10,733,256 | B2 * | 8/2020 | Fickenscher | G06F 16/248 |
| 10,791,071 | B2 * | 9/2020 | Cacioppo | H04L 51/04 |
| 10,860,787 | B2 * | 12/2020 | Siwoff | G06F 3/04845 |
| 2004/0041843 | A1 * | 3/2004 | Cui | G06F 3/0481<br>715/810 |
| 2004/0250201 | A1 * | 12/2004 | Caspi | G06Q 10/10<br>715/233 |
| 2005/0154993 | A1 * | 7/2005 | Chen | G06F 40/166<br>715/205 |
| 2005/0223315 | A1 * | 10/2005 | Shimizu | G06F 40/169<br>715/230 |
| 2005/0256866 | A1 * | 11/2005 | Lu | G06F 16/24573<br>707/999.005 |
| 2006/0098899 | A1 * | 5/2006 | King | G06Q 20/102<br>382/305 |
| 2006/0217956 | A1 * | 9/2006 | Nagao | G06F 40/58<br>704/2 |
| 2006/0241952 | A1 * | 10/2006 | Loduha | G06Q 50/18<br>705/309 |
| 2007/0055926 | A1 * | 3/2007 | Christiansen | G06F 40/169<br>715/244 |
| 2008/0071803 | A1 | 3/2008 | Boucher | |
| 2008/0086680 | A1 * | 4/2008 | Beckman | G06F 40/103<br>715/230 |
| 2008/0168073 | A1 * | 7/2008 | Siegel | G06F 16/58 |
| 2008/0270406 | A1 * | 10/2008 | Flavin | G06F 16/38 |
| 2009/0171987 | A1 * | 7/2009 | Coppinger | H04L 65/4015 |
| 2009/0187567 | A1 | 7/2009 | Rolle | |
| 2009/0210778 | A1 * | 8/2009 | Kulas | H04N 21/4788<br>715/201 |
| 2010/0278453 | A1 * | 11/2010 | King | G06F 40/197<br>715/230 |
| 2010/0313114 | A1 * | 12/2010 | Colbran | G06F 40/169<br>715/230 |
| 2011/0010397 | A1 * | 1/2011 | Kathpal | G06F 40/169<br>709/219 |
| 2011/0022941 | A1 * | 1/2011 | Osborne | G06F 16/367<br>715/230 |
| 2011/0225482 | A1 | 9/2011 | Chan et al. | |
| 2011/0289105 | A1 * | 11/2011 | Hershowitz | G06F 40/169<br>707/769 |
| 2012/0036423 | A1 | 2/2012 | Haynes, II et al. | |
| 2012/0117096 | A1 * | 5/2012 | Massand | G06F 16/14<br>707/758 |
| 2012/0173659 | A1 * | 7/2012 | Thaxter | G06F 3/04817<br>709/217 |
| 2012/0233150 | A1 * | 9/2012 | Naim | G06F 40/169<br>707/739 |
| 2013/0013999 | A1 * | 1/2013 | Kerry-Tyerman | G06Q 50/18<br>715/230 |
| 2013/0080414 | A1 | 3/2013 | Dudala | |
| 2013/0097481 | A1 * | 4/2013 | Kotler | G06F 16/34<br>715/230 |
| 2013/0151954 | A1 * | 6/2013 | Lerullo | G06F 3/04842<br>715/254 |
| 2013/0304639 | A1 * | 11/2013 | Acsay | G06Q 30/04<br>705/40 |
| 2013/0326323 | A1 * | 12/2013 | Siwoff | G06F 3/04845<br>715/229 |
| 2014/0068423 | A1 * | 3/2014 | Nakashima | G06F 40/169<br>715/243 |
| 2014/0089800 | A1 * | 3/2014 | Kao | G06F 3/0481<br>715/719 |

| | | | | |
|---|---|---|---|---|
| 2014/0122991 | A1 * | 5/2014 | Achillopoulos | G06F 40/169<br>715/230 |
| 2014/0149857 | A1 * | 5/2014 | Vagell | G06F 40/169<br>715/255 |
| 2014/0164994 | A1 * | 6/2014 | Myslinski | G06F 3/04817<br>715/808 |
| 2014/0282016 | A1 * | 9/2014 | Hosier, Jr. | G06F 3/04883<br>715/733 |
| 2014/0337760 | A1 * | 11/2014 | Heinrich | G06F 40/166<br>715/753 |
| 2014/0351693 | A1 * | 11/2014 | Glassop | G06Q 10/10<br>715/235 |
| 2015/0064685 | A1 * | 3/2015 | Goldman | G06F 40/186<br>434/428 |
| 2015/0100872 | A1 * | 4/2015 | Beezer | G06F 3/0482<br>715/230 |
| 2015/0100874 | A1 * | 4/2015 | Pallakoff | G06F 3/0481<br>715/232 |
| 2015/0106723 | A1 * | 4/2015 | Bertelsen | H04L 67/02<br>715/738 |
| 2015/0227514 | A1 * | 8/2015 | Gillett | G06F 16/93<br>707/608 |
| 2016/0041961 | A1 * | 2/2016 | Romney | G06F 40/106<br>715/230 |
| 2016/0155091 | A1 * | 6/2016 | Arndorfer | G06Q 10/101<br>705/300 |
| 2016/0232143 | A1 * | 8/2016 | Fickenscher | G06F 16/248 |
| 2016/0259769 | A1 * | 9/2016 | Siwoff | G06F 40/137 |
| 2017/0034087 | A1 * | 2/2017 | Borenstein | H04L 51/08 |
| 2017/0046113 | A1 * | 2/2017 | Noyes | H04L 65/611 |
| 2017/0115834 | A1 * | 4/2017 | Ota | G06F 40/169 |
| 2017/0116373 | A1 * | 4/2017 | Ginsburg | G16H 10/40 |
| 2017/0199855 | A1 * | 7/2017 | Fish | G06Q 10/109 |
| 2017/0235537 | A1 * | 8/2017 | Liu | G06F 3/1454<br>715/759 |
| 2018/0027206 | A1 * | 1/2018 | Li | G06F 40/171<br>348/333.02 |
| 2018/0032493 | A1 * | 2/2018 | Raleigh | G06Q 10/101 |
| 2018/0101508 | A1 * | 4/2018 | Venard | G06F 40/197 |
| 2018/0191645 | A1 * | 7/2018 | Cacioppo | H04L 67/06 |
| 2018/0232348 | A1 * | 8/2018 | Kerr | G06F 40/169 |
| 2018/0253297 | A1 * | 9/2018 | Richardson | G06F 40/169 |
| 2019/0079912 | A1 * | 3/2019 | Siwoff | G06F 40/137 |
| 2019/0129581 | A1 * | 5/2019 | Bito | G06F 40/169 |
| 2019/0129922 | A1 * | 5/2019 | Bito | G06F 3/04812 |
| 2019/0129927 | A1 * | 5/2019 | Okamoto | G06F 3/14 |
| 2019/0179501 | A1 * | 6/2019 | Seeley | G06F 3/0484 |
| 2019/0179876 | A1 * | 6/2019 | Zhang | G06F 3/0483 |
| 2019/0205772 | A1 * | 7/2019 | Kohlmeier | G06Q 10/06311 |
| 2019/0258704 | A1 * | 8/2019 | Mertens | G10L 15/22 |
| 2019/0259387 | A1 * | 8/2019 | Mertens | G10L 15/197 |
| 2019/0294660 | A1 * | 9/2019 | DeVoe | G06F 40/169 |
| 2020/0028806 | A1 * | 1/2020 | Cacioppo | H04L 67/1097 |
| 2020/0110796 | A1 * | 4/2020 | Tsabba | G06F 8/38 |
| 2020/0175268 | A1 * | 6/2020 | Lewis | G06N 3/088 |
| 2020/0293604 | A1 * | 9/2020 | Nelson | G06F 40/169 |
| 2020/0293605 | A1 * | 9/2020 | Nelson | G06N 20/00 |
| 2020/0293606 | A1 * | 9/2020 | Nelson | G06F 40/117 |
| 2020/0293607 | A1 * | 9/2020 | Nelson | G06F 40/30 |
| 2020/0293608 | A1 * | 9/2020 | Nelson | G06F 40/169 |
| 2020/0293616 | A1 * | 9/2020 | Nelson | G06Q 10/101 |
| 2020/0294640 | A1 * | 9/2020 | Ginsburg | G16H 40/20 |
| 2021/0004143 | A1 * | 1/2021 | Cooke | G06T 19/00 |

OTHER PUBLICATIONS

Non-Final Office Action from U.S. Appl. No. 16/587,729, dated Mar. 4, 2021, 21 pages.

Northcentral University Library, "Reading and Annotating Documents," Sep. 10, 2019, retrieved from https://ncu.libguides.com/c.php?g=717116&p=5104710, on Sep. 26, 2019, 5 Pages.

Notice of Allowance from U.S. Appl. No. 16/587,729, dated Jun. 1, 2021, 9 pages.

* cited by examiner

Draft Speech — 520

Here is the draft of the speech. @Bill_Seward, @John Hay, please comment.

"Four score and seven years ago our fathers brought forth, upon this continent, a new nation, conceived in liberty, and dedicated to the proposition that "all men are created equal."

Now we are engaged in a great civil war, testing whether that nation, or any nation so conceived, and so dedicated, can long endure. We are met on a great battle field of that war. We come to dedicate a portion of it, as a final resting place for those who died here, that the nation might live. This we may, in all propriety do.

But, in a larger sense, we can not dedicate -- we can not consecrate -- we can not hallow, this ground -- The brave men, living and dead, who struggled here, have hallowed it, far above our poor power to add or detract. The world will little note, nor long remember what we say here; while it can never forget what they did here.

Share — 522, 526

Comments (6) — 524

New Comment... — 512

Edward Everett   12/15/10 at 11:05 pm — 504a, 518a
You say in two minutes what would take me two hours. Well done.

Bill Seward   12/15/10 at 11:10 pm — 504b
Certainly the bloodiest...
2 more comments — 514

John Hay   12/15/10 at 11:1pm — 504c, 518b
What happened to "It is altogether fitting and proper that we should do this." ???
Reply — 516

George Bancroft   12/15/10 at 11:05 pm — 504d, 518c
I would like to use this in fundraising for soliders.
@Bill_Seward your thoughts?
Reply — 516

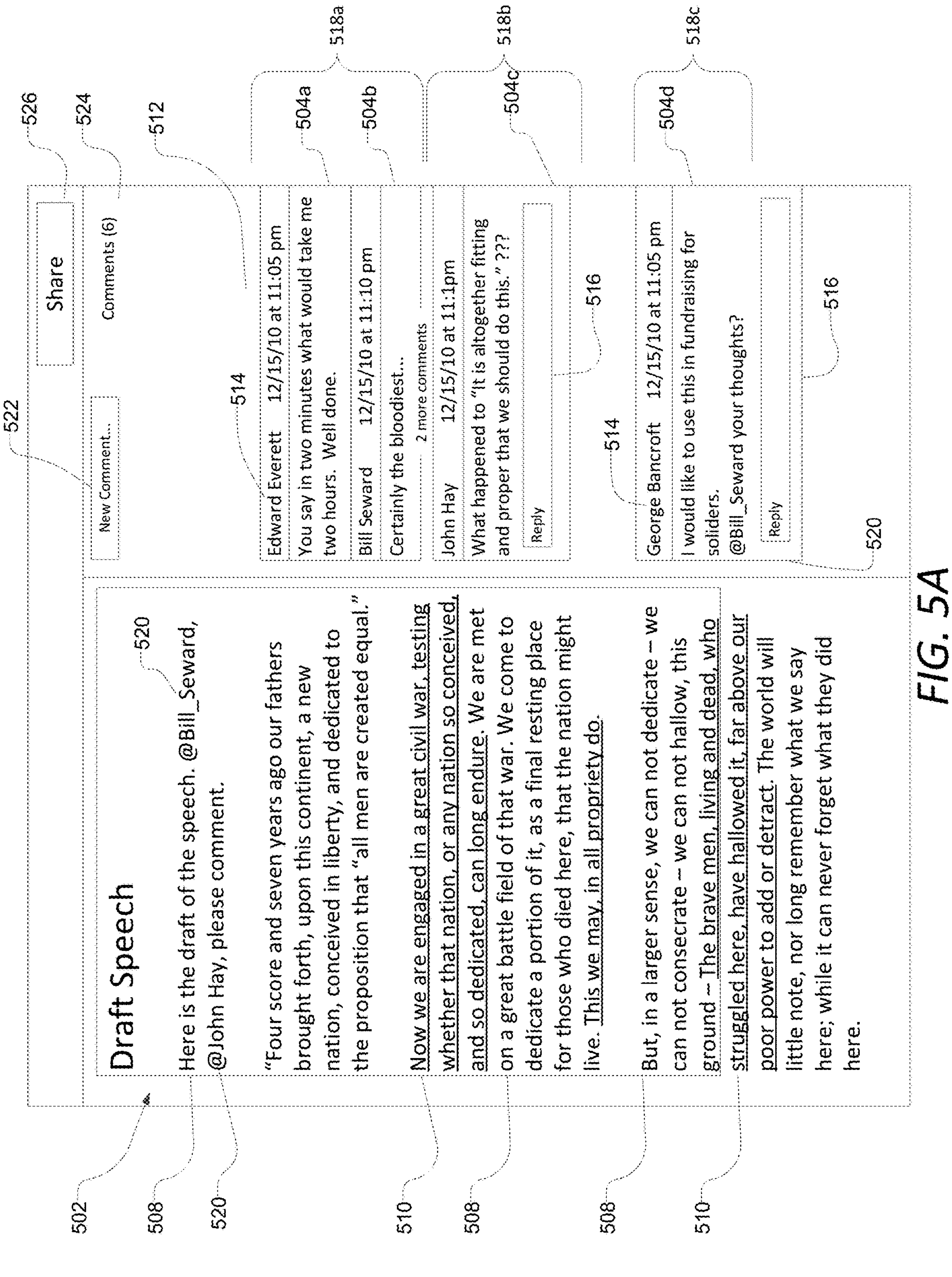

*FIG. 5A*

Draft Speech ✏ 531

Here is the draft of the speech. @Bill_Seward, @John Hay, please comment.

"Four score and seven years ago our fathers brought forth, upon this continent, a new nation, conceived in liberty, and dedicated to the proposition that "all men are created equal."

Now we are engaged in a great civil war, testing whether that nation, or any nation so conceived, and so dedicated, can long endure. We are met on a great battle field of that war. We come to dedicate a portion of it, as a final resting place for those who died here, that the nation might live. This we may, in all propriety do.

But, in a larger sense, we can not dedicate – we can not consecrate – we can not hallow, this ground – The brave men, living and dead, who struggled here, have hallowed it, far above our poor power to add or detract. The world will little note, nor long remember what we say here; while it can never forget what they did here.

[ Share ]

Comments (7) — 528

[ New Comment... ]

John Nicolay 12/16/10 at 8:25 am
I like this version better than the first draft @file
[ Reply ]

Edward Everett 12/15/10 at 11:05 pm
You say in two minutes what would take me two hours. Well done.

Bill Seward 12/15/10 at 11:10 pm
Certainly the bloodiest...
— 2 more comments —

John Hay 12/15/10 at 11:1pm
What happened to "It is altogether fitting and proper that we should do this." ???
[ Reply ]

George Bancroft 12/15/10 at 11:05 pm
I would like to use this in fundraising for soliders.
@Bill_Seward your thoughts?
[ Reply ]

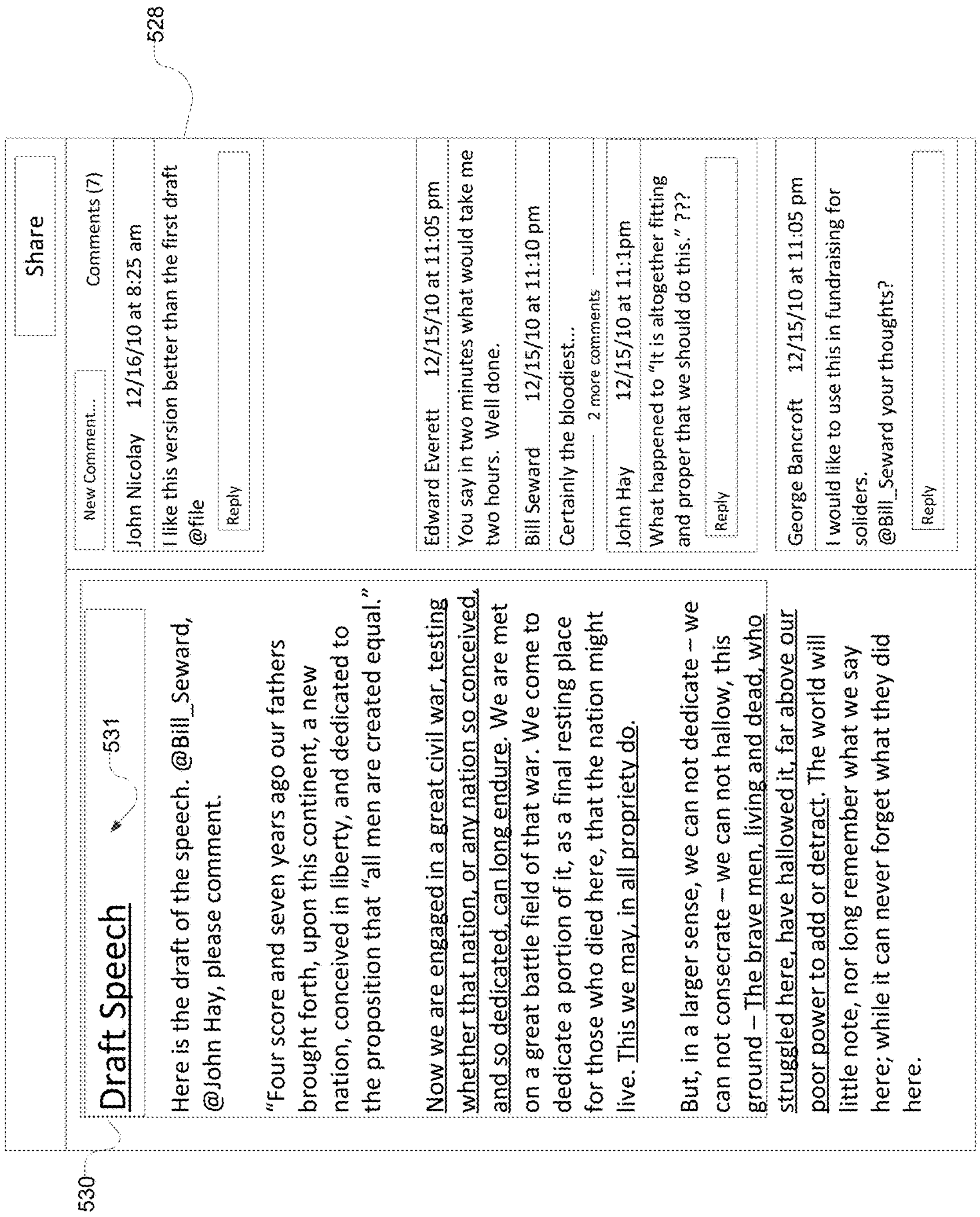

COLLABORATIVE IN-LINE CONTENT ITEM ANNOTATIONS

CROSS REFERENCE TO RELATED APPLICATIONS

This application is a continuation of U.S. application Ser. No. 16/587,729, filed Sep. 30, 2019, now U.S. Pat. No. 11,074,400, which is incorporated by reference in its entirety.

TECHNICAL FIELD

The disclosed embodiments generally relate to insertion of in-line annotation objects in collaborative content items and to the implementation and management of citations within an in-line annotation object of a collaborative content item.

BACKGROUND

Some collaborative content management systems allow for insertion of comments and footnotes in collaborative content items; however, these tools are insufficient for annotating content because, among other things, they require the user to constantly divert attention from the content being annotated to the bottom or side margin of a page where the footnotes or comments are located. In addition, these tools do not provide the best utilization of the limited display area and display resolution of many of today's user devices.

SUMMARY

Systems and methods are disclosed herein for annotating text with an in-line annotation object. The in-line annotation object may be a small, selectable object (such as a circle with an ellipsis within it) that, when selected, expands (e.g., over some surrounding text) to reveal the annotation. In an embodiment, the annotation object includes a citation for preceding text. The collaborative content management system may detect that an annotation object is to be used for citation purposes, and may automatically provide information relating to the citation, such as a suggested citation, or a template for use in filling in the citation by the user.

In an embodiment, a collaborative content management system receives a command to add an annotation object following a character input into a line of a collaborative content item. The collaborative content management system inserts an annotation object onto the line following the character. The collaborative content management system detects selection of the annotation object, and generates for display, within a display of the collaborative content item, a secondary collaborative content item, the secondary collaborative content item being in visual association with the character (e.g., above, below, or obscuring the character).

The collaborative content management system may detect textual content that corresponds to a citation within the secondary collaborative content item, and may responsively generate for display a template for inputting fields of a citation. The collaborative content management system receives text entered into one or more of the fields, generates a citation based on the text, and inputs the citation into the secondary collaborative content item. Alternatively, responsive to detecting the textual content, the collaborative content management system may generate the citation by formatting the textual content into a citation format, and inputting the citation into the secondary collaborative content item.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 5A shows an example user interface of a collaborative content item page including various comments, according to example embodiments.

FIG. 5B shows an example user interface with a file-level comment associated with the title of the collaborative content item, according to example embodiments.

The figures depict various example embodiments of the present technology for purposes of illustration only. One skilled in the art will readily recognize from the following description that other alternative example embodiments of the structures and methods illustrated herein may be employed without departing from the principles of the technology described herein.

DETAILED DESCRIPTION

System Overview

Figure 1:
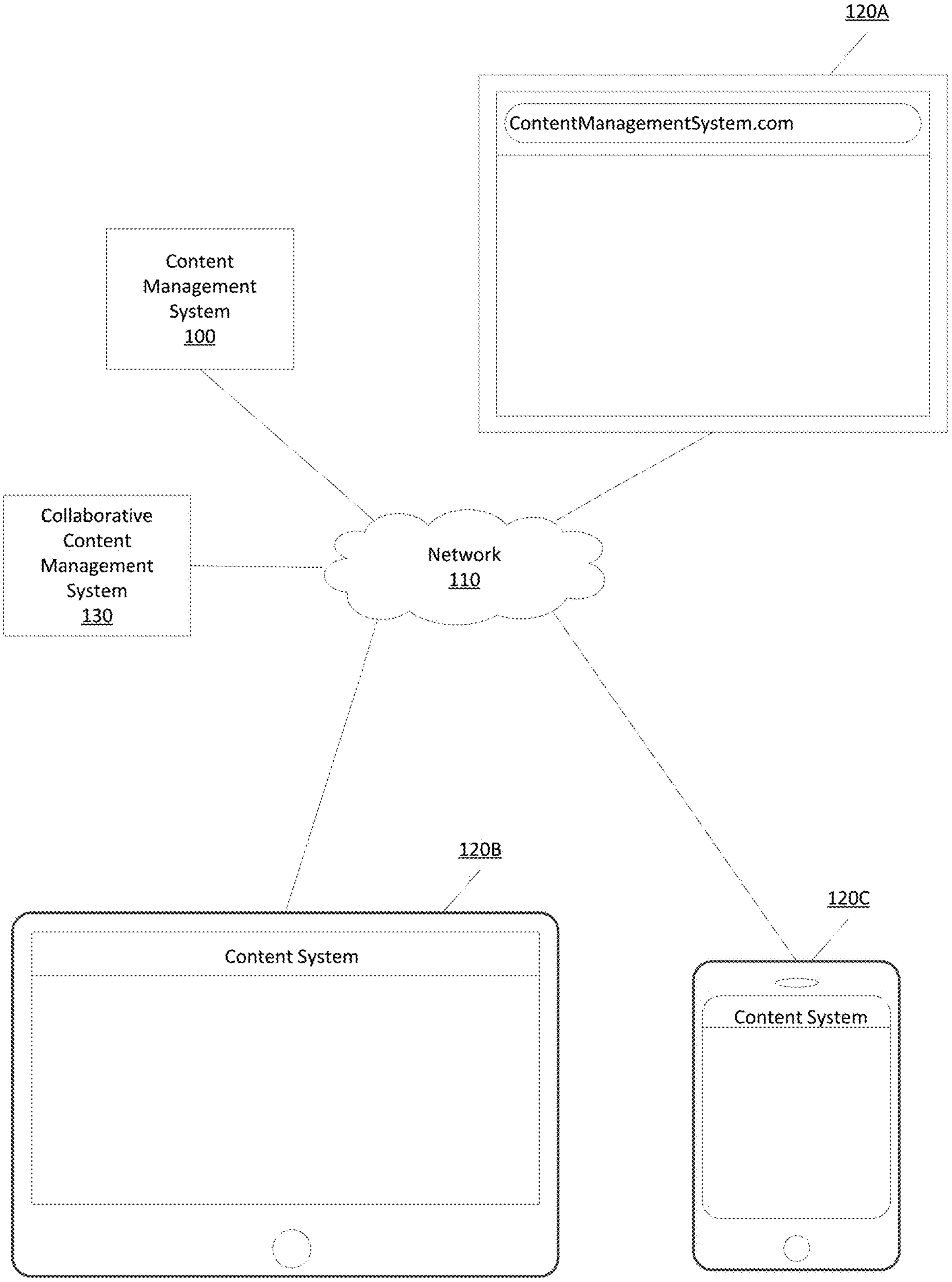
FIG. 1 shows a diagram of a system environment of a content management system and a collaborative content management system, according to example embodiments.

FIG. 1 shows a system environment including content management system 100, collaborative content management system 130, and client devices 120*a*, 120*b*, and 120*c* (collectively or individually "120"). Content management system 100 provides functionality for sharing content items with one or more client devices 120 and synchronizing content items between content management system 100 and one or more client devices 120.

The content stored by content management system 100 can include any type of content items, such as documents, spreadsheets, collaborative content items, text files, audio files, image files, video files, webpages, executable files, binary files, placeholder files that reference other content items, etc. In some implementations, a content item can be a portion of another content item, such as an image that is included in a document. Content items can also include collections, such as folders, namespaces, playlists, albums, etc., that group other content items together. The content stored by content management system 100 may be organized in one configuration in folders, tables, or in other database structures (e.g., object oriented, key/value etc.).

In some example embodiments, the content stored by content management system 100 includes content items created by using third party applications, e.g., word processors, video and image editors, database management systems, spreadsheet applications, code editors, and so forth, which are independent of content management system 100.

In some example embodiments, content stored by content management system 100 includes content items, e.g., collaborative content items, created using a collaborative interface provided by collaborative content management system 130. In various implementations, collaborative content items can be stored by collaborative content item management system 130, with content management system 100, or external to content management system 100. A collaborative interface can provide an interactive content item collaborative platform whereby multiple users can simultaneously create and edit collaborative content items, comment in the collaborative content items, and manage tasks within the collaborative content items.

Users may create accounts at content management system 100 and store content thereon by sending such content from client device 120 to content management system 100. The content can be provided by users and associated with user accounts that may have various privileges. For example, privileges can include permissions to: see content item titles, see other metadata for the content item (e.g. location data, access history, version history, creation/modification dates, comments, file hierarchies, etc.), read content item contents, modify content item metadata, modify content of a content item, comment on a content item, read comments by others on a content item, or grant or remove content item permissions for other users.

Client devices 120 communicate with content management system 100 and collaborative content management system 130 through network 110. The network may be any suitable communications network for data transmission. In some example embodiments, network 110 is the Internet and uses standard communications technologies and/or protocols. Thus, network 110 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), JavaScript Object Notation (JSON), etc. In addition, all or some of links can be encrypted using conventional encryption technologies such as the secure sockets layer (SSL), transport layer security (TLS), virtual private networks (VPNs), Internet Protocol security (IPsec), etc. In some example embodiments, the entities use custom and/or dedicated data communications technologies instead of, or in addition to, the ones described above.

In some example embodiments, content management system 100 and collaborative content management system 130 are combined into a single system. The system may include one or more servers configured to provide the functionality discussed herein for the systems 100 and 130.

Client Device

Figure 2:
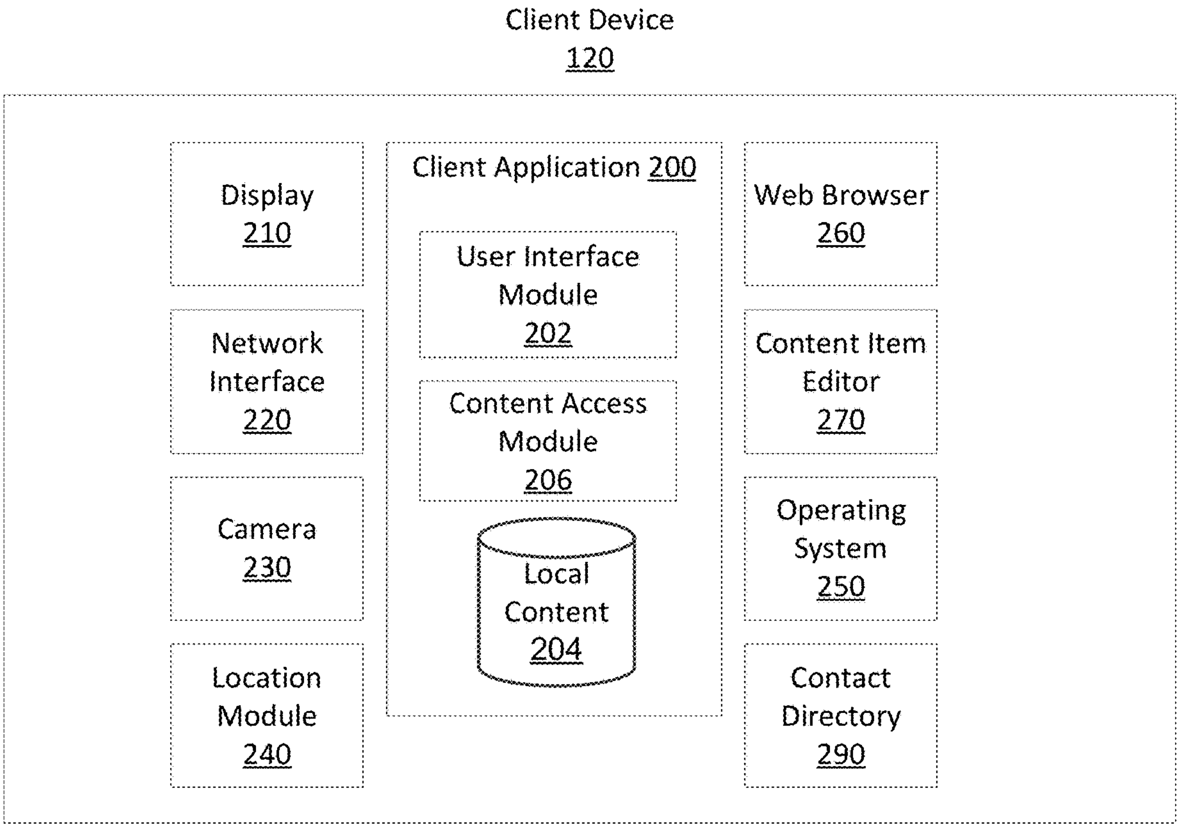
FIG. 2 shows a block diagram of components of a client device, according to example embodiments.

FIG. 2 shows a block diagram of the components of a client device 120 according to example embodiments. Client devices 120 generally include devices and modules for communicating with content management system 100 and a user of client device 120. Client device 120 includes display 210 for providing information to the user, and in certain client devices 120 includes a touchscreen. Client device 120 also includes network interface 220 for communicating with content management system 100 via network 110. There are additional components that may be included in client device 120 but that are not shown, for example, one or more computer processors, local fixed memory (RAM and ROM), as well as optionally removable memory (e.g., SD-card), power sources, and audio-video outputs.

In certain example embodiments, client device 120 includes additional components such as camera 230 and location module 240. Location module 240 determines the location of client device 120, using, for example, a global positioning satellite signal, cellular tower triangulation, or other methods. Location module 240 may be used by client application 200 to obtain location data and add the location data to metadata about a content item.

Client devices 120 maintain various types of components and modules for operating the client device and accessing content management system 100. The software modules can include operating system 250 or a collaborative content item editor 270. Collaborative content item editor 270 is configured for creating, viewing and modifying collaborative content items such as text documents, code files, mixed media files (e.g., text and graphics), presentations or the like. Operating system 250 on each device provides a local file management system and executes the various software modules such as content management system client application 200 and collaborative content item editor 270. A contact directory 290 stores information on the user's contacts, such as name, telephone numbers, company, email addresses, physical address, website URLs, and the like.

Client devices 120 access content management system 100 and collaborative content management system 130 in a variety of ways. Client device 120 may access these systems through a native application or software module, such as content management system client application 200. Client device 120 may also access content management system 100 through web browser 260. As an alternative, the client application 200 may integrate access to content management system 100 with the local file management system provided by operating system 250. When access to content management system 100 is integrated in the local file management system, a file organization scheme maintained at the content management system is represented at the client device 120 as a local file structure by operating system 250 in conjunction with client application 200.

Client application 200 manages access to content management system 100 and collaborative content management system 130. Client application 200 includes user interface module 202 that generates an interface to the content accessed by client application 200 and is one means for performing this function. The generated interface is provided to the user by display 210. Client application 200 may store content accessed from a content storage at content management system 100 in local content 204. While represented here as within client application 200, local content 204 may be stored with other data for client device 120 in non-volatile storage. When local content 204 is stored this way, the content is available to the user and other applications or modules, such as collaborative content item editor 270, when client application 200 is not in communication with content management system 100. Content access module 206 manages updates to local content 204 and communicates with content management system 100 to synchronize content modified by client device 120 with content maintained on content management system 100, and is one means for performing this function. Client application 200 may take various forms, such as a stand-alone application, an application plug-in, or a browser extension.

Content Management System

Figure 3:
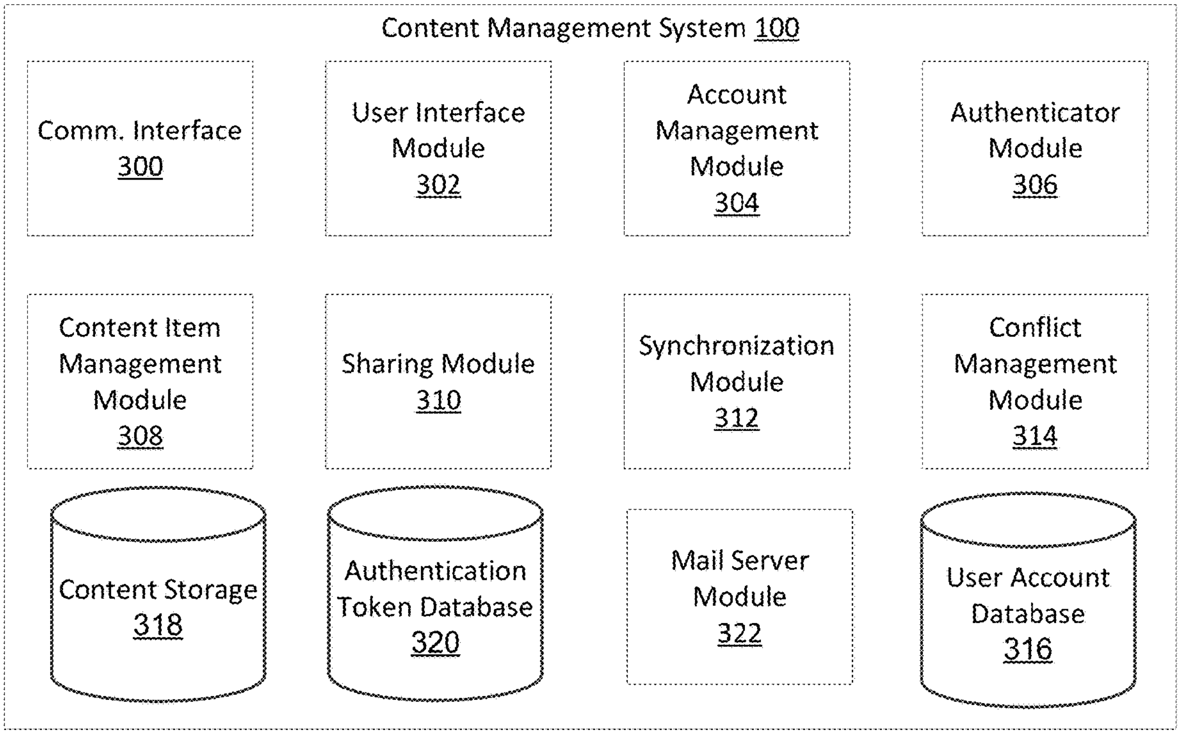
FIG. 3 shows a block diagram of a content management system, according to example embodiments.

FIG. 3 shows a block diagram of the content management system 100 according to example embodiments. To facilitate the various content management services, a user can create an account with content management system 100. The account information can be maintained in user account database 316, and is one means for performing this function. User account database 316 can store profile information for registered users. In some cases, the only personal information in the user profile is a username and/or email address. However, content management system 100 can also be configured to accept additional user information, such as password recovery information, demographics information, payment information, and other details. Each user is associated with a userID and a user name. For purposes of convenience, references herein to information such as collaborative content items or other data being "associated" with a user are understood to mean an association between a collaborative content item and either of the above forms of user identifier for the user. Similarly, data processing operations on collaborative content items and users are understood to be operations performed on derivative identifiers such as collaborativeContentItemID and userIDs. For example, a user may be associated with a collaborative content item by storing the information linking the userID and the collaborativeContentItemID in a table, file, or other storage formats. For example, a database table organized by collaborativeContentItemIDs can include a column listing the userID of each user associated with the collaborative content item. As another example, for each userID, a file can list a set of collaborativeContentItemID associated with the user. As another example, a single file can list key values pairs such as <userID, collaborativeContentItemID> representing the association between an individual user and a collaborative content item. The same types of mechanisms can be used to associate users with comments, threads, text elements, formatting attributes, and the like.

User account database 316 can also include account management information, such as account type, e.g. free or paid; usage information for each user, e.g., file usage history; maximum storage space authorized; storage space used; content storage locations; security settings; personal configuration settings; content sharing data; etc. Account management module 304 can be configured to update and/or obtain user account details in user account database 316. Account management module 304 can be configured to interact with any number of other modules in content management system 100.

An account can be used to store content items, such as collaborative content items, audio files, video files, etc., from one or more client devices associated with the account. Content items can be shared with multiple users and/or user accounts. In some implementations, sharing a content item can include associating, using sharing module 310, the content item with two or more user accounts and providing for user permissions so that a user that has authenticated into one of the associated user accounts has a specified level of access to the content item. That is, the content items can be shared across multiple client devices of varying type, capabilities, operating systems, etc. The content items can also be shared across varying types of user accounts.

Individual users can be assigned different access privileges to a content item shared with them, as discussed above. In some cases, a user's permissions for a content item can be explicitly set for that user. A user's permissions can also be set based on: a type or category associated with the user (e.g., elevated permissions for administrator users or manager), the user's inclusion in a group or being identified as part of an organization (e.g., specified permissions for all members of a particular team), and/or a mechanism or context of a user's accesses to a content item (e.g., different permissions based on where the user is, what network the user is on, what type of program or API the user is accessing, whether the user clicked a link to the content item, etc.). Additionally, permissions can be set by default for users, user types/groups, or for various access mechanisms and contexts.

In some implementations, shared content items can be accessible to a recipient user without requiring authentication into a user account. This can include sharing module 310 providing access to a content item through activation of a link associated with the content item or providing access through a globally accessible shared folder.

The content can be stored in content storage 318, which is one means for performing this function. Content storage 318 can be a storage device, multiple storage devices, or a server. Alternatively, content storage 318 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

Content storage 318 can decrease the amount of storage space required by identifying duplicate files or duplicate segments of files. Instead of storing multiple copies of an identical content item, content storage 318 can store a single copy and then use a pointer or other mechanism to link the duplicates to the single copy. Similarly, content storage 318 stores files using a file version control mechanism that tracks changes to files, different versions of files (such as a diverging version tree), and a change history. The change history can include a set of changes that, when applied to the original file version, produces the changed file version.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later-submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API), which is one means for performing this function. Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a web site.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. After receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

In some example embodiments, content management system 100 includes a content management module 308 for maintaining a content directory that identifies the location of each content item in content storage 318, and allows client applications to request access to content items in the storage 318, and which is one means for performing this function. A content entry in the content directory can also include a content pointer that identifies the location of the content item in content storage 318. For example, the content entry can include a content pointer designating the storage address of the content item in memory. In some example embodiments, the content entry includes multiple content pointers that point to multiple locations, each of which contains a portion of the content item.

In addition to a content path and content pointer, a content entry in some configurations also includes user account identifier that identifies the user account that has access to the content item. In some example embodiments, multiple user account identifiers can be associated with a single content entry indicating that the content item has shared access by the multiple user accounts.

In some example embodiments, the content management system 100 can include a mail server module 322. The mail server module 322 can send (and receive) collaborative content items to (and from) other client devices using the collaborative content management system 100. The mail server module can also be used to send and receive messages between users in the content management system.

Collaborative Content Management System

Figure 4:
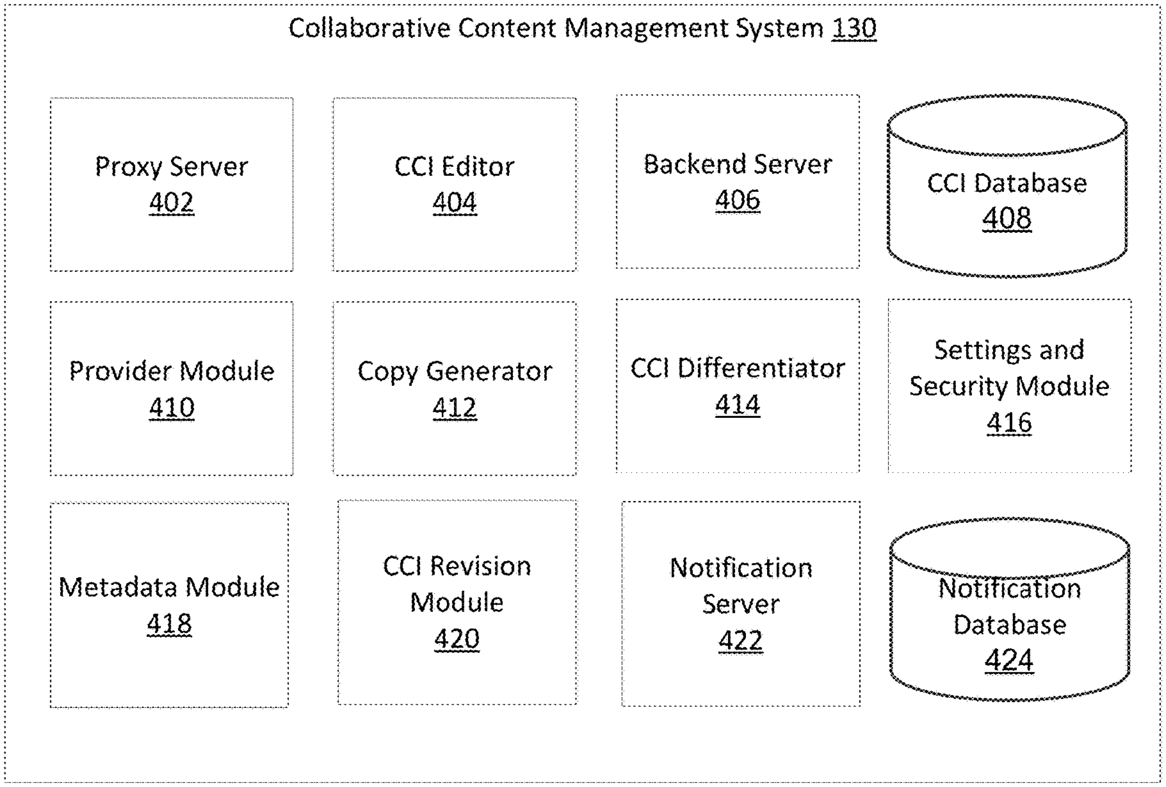
FIG. 4 shows a block diagram of a collaborative content management system, according to example embodiments.

FIG. 4 shows a block diagram of the collaborative content management system 130, according to example embodiments. Collaborative content items can be files that users can create and edit using a collaborative content items editor 270 and can contain collaborative content item elements. Collaborative content item elements may include any type of content such as text; images, animations, videos, audio, or other multi-media; tables; lists; references to external content; programming code; tasks; tags or labels; comments; or any other type of content. Collaborative content item elements can be associated with an author identifier, attributes, interaction information, comments, sharing users, etc. Collaborative content item elements can be stored as database entities, which allows for searching and retrieving the collaborative content items. As with other types of content items, collaborative content items may be shared and synchronized with multiple users and client devices 120, using sharing 310 and synchronization 312 modules of content management system 100. Users operate client devices 120 to create and edit collaborative content items, and to share collaborative content items with other users of client devices 120. Changes to a collaborative content item by one client device 120 are propagated to other client devices 120 of users associated with that collaborative content item.

In example embodiments of FIG. 1, collaborative content management system 130 is shown as separate from content management system 100 and can communicate with it to obtain its services. In other example embodiments, collaborative content management system 130 is a subsystem of the component of content management system 100 that provides sharing and collaborative services for various types of content items. User account database 316 and authentication token database 320 from content management system 100 are used for accessing collaborative content management system 130 described herein.

Collaborative content management system 130 can include various servers for managing access and edits to collaborative content items and for managing notifications about certain changes made to collaborative content items. Collaborative content management system 130 can include proxy server 402, collaborative content item editor 404, backend server 406, and collaborative content item database 408, access link module 410, copy generator 412, collaborative content item differentiator 414, settings module 416, metadata module 418, revision module 420, notification server 422, and notification database 424. Proxy server 402 handles requests from client applications 200 and passes those requests to the collaborative content item editor 404. Collaborative content item editor 404 manages application level requests for client applications 200 for editing and creating collaborative content items, and selectively interacts with backend servers 406 for processing lower level processing tasks on collaborative content items, and interfacing with collaborative content items database 408 as needed. Collaborative content items database 408 contains a plurality of database objects representing collaborative content items, comment threads, and comments. Each of the database objects can be associated with a content pointer indicating the location of each object within the CCI database 408. Notification server 422 detects actions performed on collaborative content items that trigger notifications, creates notifications in notification database 424, and sends notifications to client devices.

Client application 200 sends a request relating to a collaborative content item to proxy server 402. Generally, a request indicates the userID ("UID") of the user, and the collaborativeContentItemID ("NID") of the collaborative content item, and additional contextual information as appropriate, such as the text of the collaborative content item. When proxy server 402 receives the request, the proxy server 402 passes the request to the collaborative content item editor 404. Proxy server 402 also returns a reference to the identified collaborative content items proxy server 402 to client application 200, so the client application can directly communicate with the collaborative content item editor 404 for future requests. In alternative example embodiments, client application 200 initially communicates directly with a specific collaborative content item editor 404 assigned to the userID.

When collaborative content item editor 404 receives a request, it determines whether the request can be executed directly or by a backend server 406. When the request adds, edits, or otherwise modifies a collaborative content item the request is handled by the collaborative content item editor 404. If the request is directed to a database or index inquiry, the request is executed by a backend server 406. For example, a request from client device 120 to view a collaborative content item or obtain a list of collaborative content items responsive to a search term is processed by backend server 406.

The access module 410 receives a request to provide a collaborative content item to a client device. In some example embodiments, the access module generates an access link to the collaborative content item, for instance in response to a request to share the collaborative content item by an author. The access link can be a hyperlink including or associated with the identification information of the CCI (i.e., unique identifier, content pointer, etc.). The hyperlink can also include any type of relevant metadata within the content management system (i.e., author, recipient, time created, etc.). In some example embodiments, the access module can also provide the access link to user accounts via the network 110, while in other example embodiments the access link can be provided or made accessible to a user account and is accessed through a user account via the client device. In some example embodiments, the access link will be a hyperlink to a landing page (e.g., a webpage, a digital store front, an application login, etc.) and activating the hyperlink opens the landing page on a client device. The landing page can allow client devices not associated with a user account to create a user account and access the collaborative content item using the identification information associated with the access link. Additionally, the access link module can insert metadata into the collaborative content item, associate metadata with the collaborative content item, or access metadata associated with the collaborative content item that is requested.

The access module 410 can also provide collaborative content items via other methods. For example, the access module 410 can directly send a collaborative content item to a client device or user account, store a collaborative content item in a database accessible to the client device, interact with any module of the collaborative content management system to provide modified versions of collaborative content items (e.g., the copy generator 412, the CCI differentiator 414, etc.), sending content pointer associated with the collaborative content item, sending metadata associated with the collaborative content item, or any other method of providing collaborative content items between devices in the network. The access module can also provide collaborative content items via a search of the collaborative content item database (i.e., search by a keyword associated with the collaborative content item, the title, or a metadata tag, etc.).

The copy generator 412 can duplicate a collaborative content item. Generally, the copy generator duplicates a collaborative content item when a client device selects an access link associated with the collaborative content item. The copy generator 412 accesses the collaborative content item associated with the access link and creates a derivative copy of the collaborative content item for every request received. The copy generator 412 stores each derivative copy of the collaborative content item in the collaborative content item database 408. Generally, each copy of the collaborative content item that is generated by the copy generator 412 is associated with both the client device from which the request was received and the user account associated with the client device requesting the copy. When the copy of the collaborative content item is generated it can create a new unique identifier and content pointer for the copy of the collaborative content item. Additionally, the copy generator 412 can insert metadata into the collaborative content item, associate metadata with the copied collaborative content item, or access metadata associated with the collaborative content item that was requested to be copied.

The collaborative content item differentiator 414 determines the difference between two collaborative content items. In some example embodiments, the collaborative content item differentiator 414 determines the difference between two collaborative content items when a client device selects an access hyperlink and accesses a collaborative content item that the client device has previously used the copy generator 412 to create a derivative copy. The content item differentiator can indicate the differences between the content elements of the compared collaborative content items. The collaborative content item differentiator 414 can create a collaborative content item that includes the differences between the two collaborative content items, i.e. a differential collaborative content item. In some example embodiments, the collaborative content item differentiator provides the differential collaborative content item to a requesting client device 120. The differentiator 414 can store the differential collaborative content item in the collaborative content item database 408 and generate identification information for the differential collaborative content item. Additionally, the differentiator 414 can insert metadata into the accessed and created collaborative content items, associate metadata with the accessed and created collaborative content item, or access metadata associated with the collaborative content items that were requested to be differentiated.

The settings and security module 416 can manage security during interactions between client devices 120, the content management system 100, and the collaborative content management system 130. Additionally, the settings and security module 416 can manage security during interactions between modules of the collaborative content management system. For example, when a client device 120 attempts to interact within any module of the collaborative content management system 100, the settings and security module 416 can manage the interaction by limiting or disallowing the interaction. Similarly, the settings and security module 416 can limit or disallow interactions between modules of the collaborative content management system 130. Generally, the settings and security module 416 accesses metadata associated with the modules, systems 100 and 130, devices 120, user accounts, and collaborative content items to determine the security actions to take. Security actions can include: requiring authentication of client devices 120 and user accounts, requiring passwords for content items, removing metadata from collaborative content items, preventing collaborative content items from being edited, revised, saved or copied, or any other security similar security action. Additionally, settings and security module can access, add, edit or delete any type of metadata associated with any element of content management system 100, collaborative content management system 130, client devices 120, or collaborative content items.

The metadata module 418 manages metadata within with the collaborative content management system. Generally, metadata can take three forms within the collaborative content management system: internal metadata, external metadata, and device metadata. Internal metadata is metadata within a collaborative content item, external metadata is metadata associated with a CCI but not included or stored within the CCI itself, and device metadata is associated with client devices. At any point the metadata module can manage metadata by changing, adding, or removing metadata.

Some examples of internal metadata can be: identifying information within collaborative content items (e.g., email addresses, names, addresses, phone numbers, social security numbers, account or credit card numbers, etc.); metadata associated with content elements (e.g., location, time created, content element type; content element size; content element duration, etc.); comments associated with content elements (e.g., a comment giving the definition of a word in a collaborative content item and its attribution to the user account that made the comment); or any other metadata that can be contained within a collaborative content item.

Some examples of external metadata can be: content tags indicating categories for the metadata; user accounts associated with a CCI (e.g., author user account, editing user account, accessing user account etc.); historical information (e.g., previous versions, access times, edit times, author times, etc.); security settings; identifying information (e.g., unique identifier, content pointer); collaborative content management system 130 settings; user account settings; or any other metadata that can be associated with the collaborative content item.

Some examples of device metadata can be: device type; device connectivity; device size; device functionality; device sound and display settings; device location; user accounts associated with the device; device security settings; or any other type of metadata that can be associated with a client device 120.

The collaborative content item revision module 420 manages application level requests for client applications 200 for revising differntial collaborative content items and selectively interacts with backend servers 406 for processing lower level processing tasks on collaborative content items, and interfacing with collaborative content items database 408 as needed. The revision module can create a revised collaborative content item that is some combination of the content elements from the differential collaborative content item. The revision module 420 can store the revised collaborative content item in the collaborative content item database or provide the revised collaborative content item to a client device 120. Additionally, the revision module 420 can insert metadata into the accessed and created collaborative content items, associate metadata with the accessed and created collaborative content item, or access metadata associated with the collaborative content items that were requested to be differentiated.

Content management system 100 and collaborative content management system 130 may be implemented using a single computer, or a network of computers, including cloud-based computer implementations. The operations of content management system 100 and collaborative content management system 130 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, collaborative content items servers, failover servers, network management tools and so forth are not shown so as not to obscure the features of the system. Finally, the functions and operations of content management system 100 and collaborative content management system 130 are sufficiently complex as to require implementation on a computer system, and cannot be performed in the human mind simply by mental steps.

Comment Management User Interface

Referring now to FIG. 5A, there is shown an example user interface of a page of a collaborative content item 502 entitled “Draft Speech” in which several comments 504 associated with the collaborative content item have been made. In this example, a collaborative content item 502 is composed of content such as lines of text, which can be arranged such as in paragraph blocks 508, and may include any other form of media, such as images, videos, spreadsheets, executable or interpretable code, and so forth.

Content Level Comments

A collaborative content item 502 can have zero or more content level comments 504. Content level comments can be associated with specific portions of a collaborative content item. The presence of content level comments 504 within the content item may be indicated by underlined (or colored underlined) portions 510 of content, though any other formatting may be used to indicate the presence of a content level comment 504 (e.g., lines connecting the content level comments to the content item, comment numbers in superscript form, highlighting, a "hover over" display indicator etc.). The portion 510 of content with which a content level comment is associated is also called a span. Content level comments 504 can be associated with overlapping spans; the first and second content level comments 504*a*, 504*b* are applied to the span "Now we are engaged in a great civil war, testing whether that nation, or any nation so conceived, and so dedicated, can long endure" and the third comment 504*c* is associated with just the span "This we may, in all propriety do."

The content level comments 504 can be arranged in a comment pane 512 positioned to the side of the body of the collaborative content item 502. Each content level comment 504 has an author 514 (indicated by user name) and a creation date and time. A collection of comments that together form an exchange between users with respect to a single span is a thread 518. Threads are displayed proximate the span that is associated with the thread. In the example of FIG. 5A, there are three threads, 518*a*, 518*b*, and 518*c*; thread 518*a* has a total of four comments (two shown, and "2 more comments" as indicated) and the other threads have one comment each.

A user may create a new comment or reply to existing comment. To create a comment, a user selects a span in the content item, and activates a comment function, for example via button 522, menu or other input. The new comment 504 is displayed in the comment pane 512, indicating the user name and creation time, and the user may then enter text for the comment therein. The user can apply text formatting to the text of the comment as done for formatting the text of the collaborative content item. A user may also create a comment to include in a thread by entering text into a reply field 516 in one of the comments 504, such as the most recent comment in a thread 518.

When a user opens a collaborative content item initially, the comment pane 512 can be closed such that the comments therein are hidden. The user can activate the comment pane 512 to show the content level comments by selecting text (e.g., double clicking) that is formatted or otherwise indicated as having an associated comment. In some implementations, the comment pane 512 can be visible when a collaborative content item is opened. The pane 512 includes a counter 524 of the current number of content level comments in the collaborative content item that are visible to the user. Each comment can have a state, as to whether the comment is active or resolved. The counter 524 serves as a menu that the user can select from to filter the comments so as to show all comments, active comments or resolved comments.

A collaborative content item may also include a share icon 526 that allows a user to share the collaborative content item with other users of the content management system 100. Upon clicking on the share icon 526 a sharing interface is displayed to the user. The sharing interface can include a field for adding user names or email addresses to the list of users with which the collaborative content item is to be shared. The sharing interface may also include a text field to allow the sharing user to send a message to users receiving the request to share the collaborative content item.

User Primitives

In some example embodiments, the collaborative content management system 130 is configured to recognize particular text patterns as functional primitives that activate various functions of the collaborative content management system 130. One type of functional primitive is a user primitive. A user primitive is indicated by a predetermined token followed by the user name of a user. The user primitive is used in the text or comments of a collaborative content item to programmatically associate a specific user with the collaborative content item or comment. Colloquially, the appearance of a user primitive identifying a user name is called a mention of a user.

In some example embodiments, the user primitive takes the form of @username where the "@" symbols is a predetermined token indicates to the collaborative content management system 130 that the following string username is the user name of a system user. Referring to FIG. 5A, several examples of user primitives 520 are illustrated. First in the text of the collaborative content item, the first sentence includes the user primitives "@Bill_Seward" and "@John_Hay". The user primitive "@Bill_Seward" is also shown in the text of comment 504*d*. The collaborative content management system 130 recognizes these primitives as it processes the text of the collaborative content item and comments.

When a user primitive indicating a specific user appears in the span for a thread, or the text of a comment, the collaborative content management system 130 includes the userID for the indicated user in the audience for thread containing the comment. This allows the mentioned user to see the entire thread in which they are mentioned when accessing the collaborative content item (since access to the thread when opening a collaborative content item is determined by presence of a user's ID in the audience), as well for a mechanism to notify the user, as next described.

In some example embodiments, when a user primitive occurs elsewhere in the collaborative content item, but outside of the span for the thread, the userID for the mentioned user is included in the audience. For example, if a user is mentioned in the same paragraph as the span for a thread, the userID for the user is included in the audience.

Contextual Primitives

In addition to user primitives, the collaborative content management system 130 may also support contextual primitives. Contextual primitives function in a similar way to user primitives, however, instead of adding a single user to the audience of a thread, contextual primitives can add a group of users, or user(s) assigned to a specific role (e.g., owner, editor, etc.), to the audience of a thread using document context. A contextual primitive is indicated by a predetermined token followed by a predetermined text string. Each predefined text string may incur different functionality from the collaborative content management system 130. A user inserts the contextual primitive as they are editing the content item.

In some implementations, including the @doc primitive can cause every user with access to the collaborative content item to be included in the audience of a thread that includes the primitive. An algorithm to achieve this functionality is as follows. The collaborative content management system 130 detects the "@doc" text string in the span of a thread or in a comment content and accesses the collaborative content item index of the collaborative content item database 408. The collaborative content management system 130 determines the userIDs with viewing privileges for the collaborative content item according to the collaborative content item index and adds those userIDs to the audience_list for the thread. Alternatively, as discussed below, the system can include an entry in the collaborative content item audience list indicating that multiple users such as all users, authenticated users, users that are part of a particular group, etc., should be included as audience members. When the collaborative content item is subsequently accessed, the thread including the "@doc" primitive will be visible to all users viewing the collaborative content item. Additionally, any notification generating activity in the thread will be reported to all users in the collaborative content item.

In some example embodiments, the "@doc" primitive is dynamic such that any users that are added to the collaborative content item even after the thread has been created will be able to view the comment thread. This may be accomplished by reevaluating the span of a thread and the comment text of a thread each time the collaborative content item is compiled. Alternatively, instead of adding userIDs to the audience_list of a thread directly, the collaborative content management system 130 may create a special ID value indicating that the "@doc" primitive has been used. Therefore, during compilation of the collaborative content item, the collaborative content management system 130 checks to see if a particular thread should be displayed to a viewing user by referencing the audience_list of the thread. If the collaborative content management system 130 detects the special ID associated with the "@doc" primitive it will reference the collaborative content item database 408 to determine which users have viewing permissions. If the user ID of the current user is included in the collaborative content item database 408 then the collaborative content management system 130 displays the thread to the current user.

In addition the collaborative content item audience primitive, other contextual primitives may be implemented:

The "@folder" primitive informs the collaborative content management system 130 that all users with access to the folder that includes the collaborative content item should be able to view the thread. In this case, some of the users that have access to the folder may not have access to the collaborative content item. In this case, the collaborative content management system 130 may grant all users with access to the folder access to the collaborative content item, provide a separate interface for users without access to the collaborative content item to view the thread, or it may provide the users without access to the collaborative content item with notifications regarding the thread over email.

The "@editing" primitive indicates that all users with editing access to the collaborative content item are to be included in the audience for a thread. The collaborative content management system 130 parses this in the same way as the "@doc" primitive. However, instead of retrieving all users associated with the collaborative content item in the collaborative content item index only users with editing access are added to the audience_list for the thread. The "@ sharing" primitive (only users with sharing privileges are added to the audience_list) functionality is implemented in a similar manner.

The "@threads" primitive adds all users that have participated in threads in the collaborative content item already to the audience_list of the current thread. To accomplish this, upon detecting the "@threads" primitive the collaborative content management system 130 accesses each thread object associated with the collaborativeContentItemID and adds any users listed in the audience list of those threads the audience list of the current thread.

Depending on the example embodiments, the specific text string associated with the primitive may be different. A user may also define their own contextual primitive using the client application to select users, categories of users, and contextual categories of users to be included in the primitive. Additionally, and contextual primitive may be made dynamic using a special ID in the audience_list which triggers a reevaluation of the audience list during compilation of the collaborative content item.

File-level Comment Interfaces

The collaborative content management system 130 also enables file-level commenting and may utilize a number of user interfaces depending on the example embodiments. A file-level comment is associated with the file itself and persists with the file until the file is deleted or the comment itself is deleted. This allows for conversations between users to occur on a file-level that persists with each iteration on the file. The methods described herein, also allow for the simultaneous display of the collaborative content item and file-level comments so a user can review the collaborative content item and make comments on the collaborative content item without having to change windows. File-level comments have many of the same characteristics as the content level comments and rely on the same underlying data structure. However, file-level comments are not associated with a span of the collaborative content item and are instead associated with the entirety of the content item. Despite these differences, file-level comments may be used to form threads and have an associated author, creation time and date, which may be displayed in a similar fashion as in content level comments depending on the example embodiments.

Because file-level comments are not associated with a particular span of the collaborative content item, different UI elements may be used to display the file-level comments. FIG. 5B illustrates example embodiments for creating and displaying file-level comments.

FIG. 5B shows an example user interface with a file-level comment associated with the title of the collaborative content item. FIG. 5B displays the same six comments and four threads as in FIG. 5A, with the addition of a file-level comment 528. The file-level comment is displayed alongside the content level comments in the comment pane 512. Instead of being for a particular span in the collaborative content item, as with the content level comments, the file-level comment 528 is associated with the entire document, and is indicated in the collaborative content item by visually distinguishing features 531, such as formatting or highlighting, borders or the like to the title of the collaborative content item 530. Optionally, the same visually distinguishing features can be applied to the comment itself, so that the user knows that which comments are associated with the file and which with specific spans of the content item. FIG. 5B also illustrates the use of a file-level primitive 532, "@file", to indicate that a comment is file-level comment rather than a content level comment.

Annotation Object Overview

Figure 6:
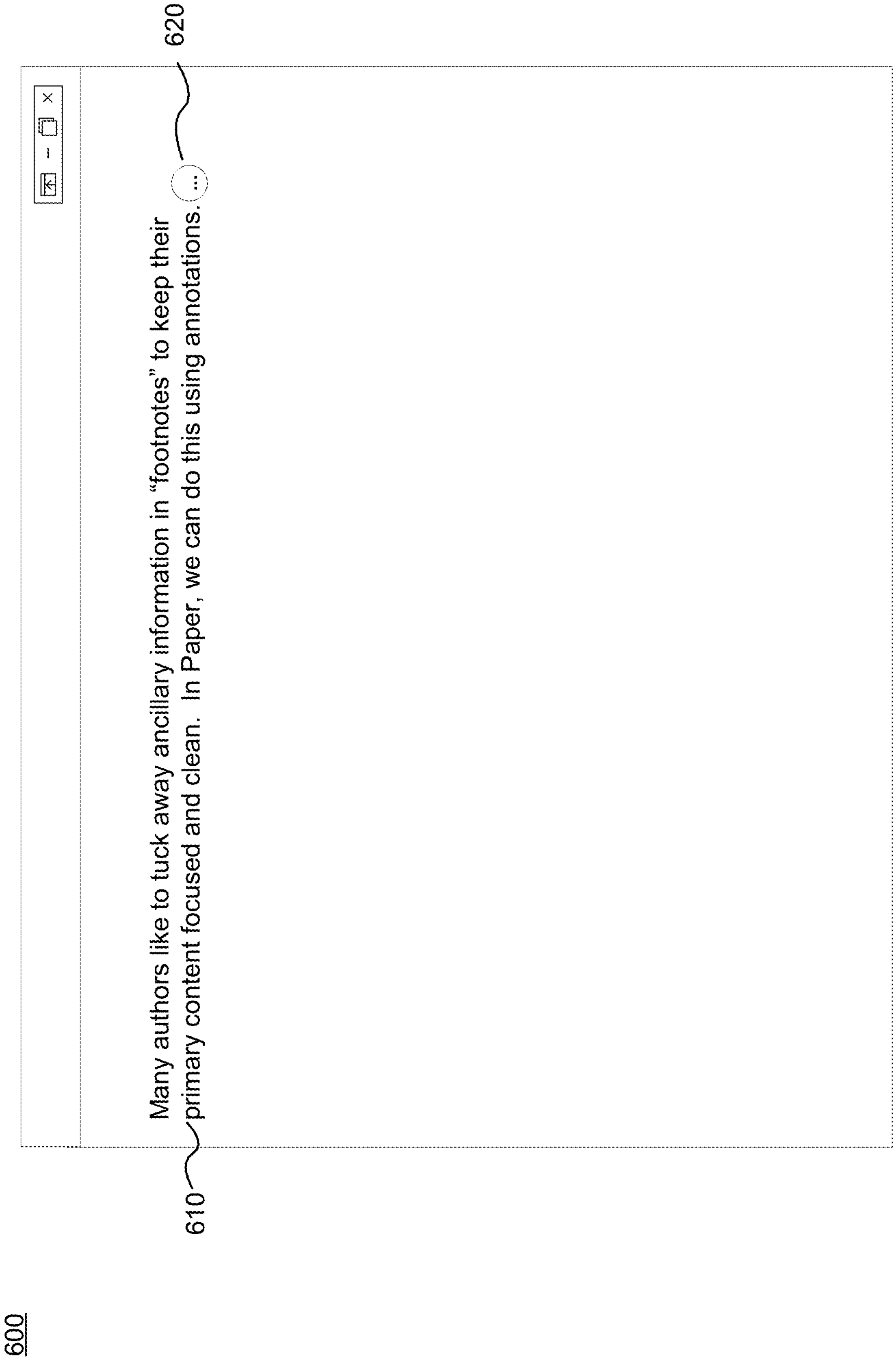
FIG. 6 shows an example collaborative content item including an annotation object.

FIG. 6 shows an example collaborative content item including an annotation object. Collaborative content item 600 may be any form of collaborative content item, and may include collaborative content. Some collaborative content may be on line 610. Line 610 represents a single horizontal row of characters, such as alphanumeric and other standard keyboard characters or characters retrievable using a standard character map. Annotation object 620 is embedded on line 610, following the word "annotations" (and adjacent to either the letter "s", or a space character of " "), though annotation object 620 may be embedded between, preceding, or following any character in collaborative content item 600. The term "annotation object," as used herein, refers to a special object that is selectable by the user, and, following being selected, automatically opens a secondary collaborative content item (to be described with reference to FIG. 7 below) for entry of, or viewing of, additional content.

A user present on collaborative content item 600 may add annotation object 620 to the collaborative content item using a command to add an annotation object to a selected position in collaborative content item 600. The command may be hot keyed to a certain keyboard shortcut, may be selected from an interface of collaborative content item editor 270, may be entered via voice command, or through any other means of entry. The selected position may be, for example, a present position of a cursor. Alternatively, the collaborative content management system may embed the annotation object into a position specified by the command (e.g., a voice command stating "insert an annotation object after the word 'annotations'.") Thus, the annotation object can be inserted anywhere where a regular character or symbol could be inserted, such as before, after, or in the middle of any word, sentence, paragraph, etc. Furthermore, in some embodiments, any action that can be taken with respect to a character can be taken with respect to annotation object 720. For example, annotation object 720 may be cut or copied and pasted elsewhere on collaborative content item 600 or on a different collaborative content item, while maintaining its association with the secondary collaborative content item.

Figure 7:
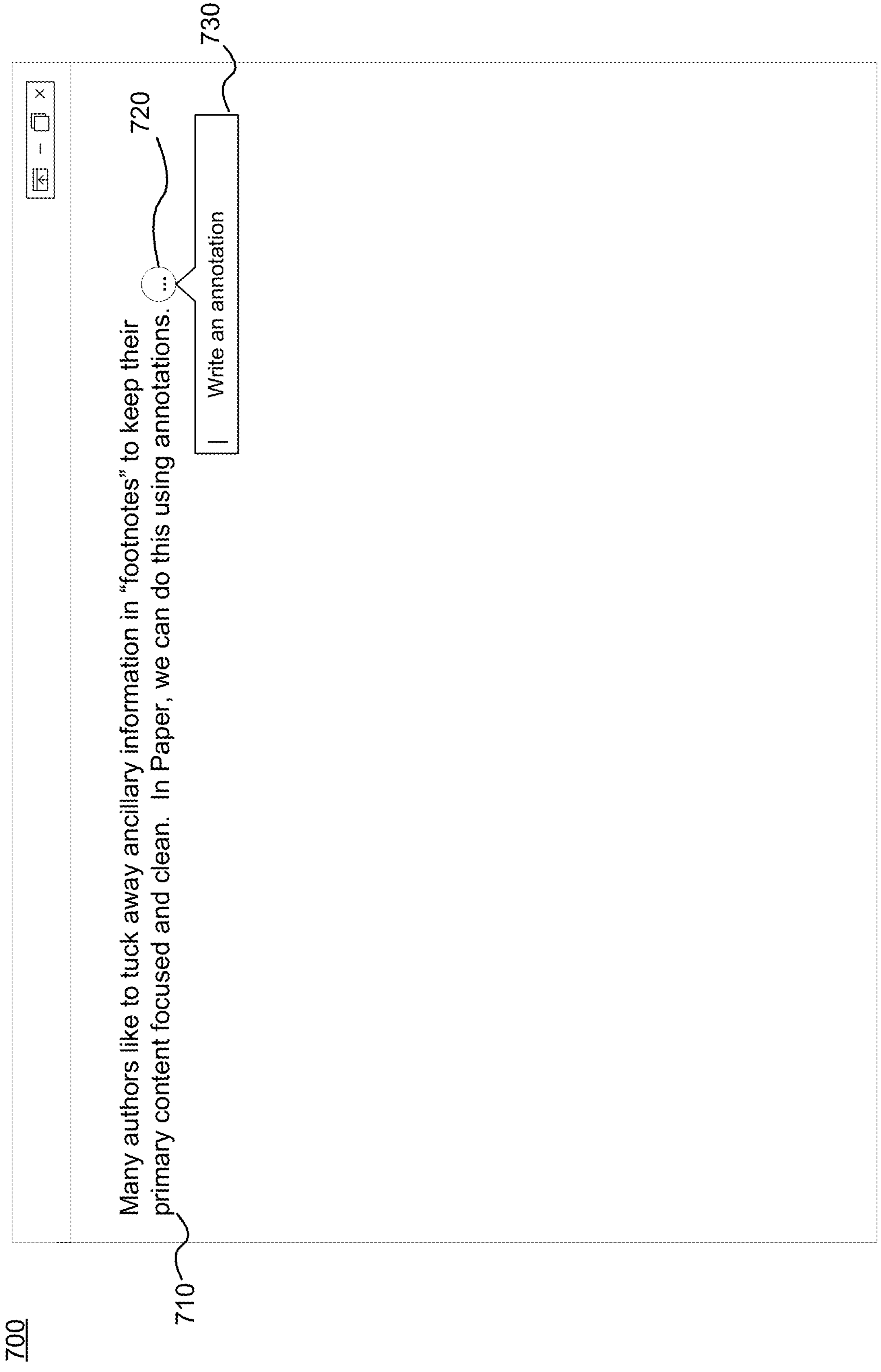
FIG. 7 shows an example collaborative content item including an expanded annotation object for insertion of content into a secondary collaborative content item

FIG. 7 shows an example collaborative content item including an expanded annotation object for insertion of content into a secondary collaborative content item. Collaborative content item 700 includes collaborative content in line 710, along with annotation object 720. Each of these items include the full force of description of similarly numbered items in FIG. 6. Responsive to detecting a creation of a new annotation object 720 or a selection of an existing annotation object 720, the collaborative content management system generates for display secondary collaborative content item 730. The term secondary collaborative content item, as used herein, refers to a collaborative content item that is included within the collaborative content item containing a selected annotation object. It is effectively a collaborative content item that is included within another collaborative content item, and that can include some or all of the functionalities and capabilities of a collaborative content item, including the ability to be collaborated on (e.g., edited) by multiple users at the same time.

Secondary collaborative content item 730 is depicted as displayed below line 710; however, this is merely exemplary. The collaborative content management system may generate secondary collaborative content item 730 for display anywhere on collaborative content item 700. In an embodiment, secondary collaborative content item 730 is displayed under, over, or next to annotation object 720. For example, secondary collaborative content item 730 can be horizontally centered substantially at or near annotation object 720. As another example, secondary collaborative content item 730 can be centered at a predefined vertical and/or horizontal offset from annotation object 720. As another example, secondary collaborative content item 730 can be positioned or centered anywhere within a predefined distance from annotation object 720. In some embodiments, secondary collaborative content item 730 can be contained in a user interface element having a shape that includes (e.g., at its horizontal center) a pointing element pointing directly to annotation object 720. In an embodiment, secondary collaborative content item 730 obscures content of collaborative content item 700 by being overlaid on top of the obscured content. The collaborative content management system may determine whether there is blank space within a threshold number of lines of annotation object 720, and responsive to determining that there is such blank space, may generate for display annotation object 720 in that blank space to avoid obscuring content in collaborative content item 700. In an embodiment, while secondary collaborative content item 730 is displayed, the collaborative content management system may cause other content of collaborative content item 700 to be grayed out or otherwise obscured (e.g., to emphasize the user's attention toward collaborative content item 730).

In an embodiment, rather than generate for display secondary collaborative content item 730 within collaborative content item 700, the collaborative content management system may generate for display secondary collaborative content item 730 within a different user interface element, such as a different window or tab, in a popup element, or the like.

Regardless of how secondary collaborative content item 730 is displayed, when annotation 720 is initially populated and thus secondary collaborative content item 730 has not yet had any user input, secondary collaborative content item 730 may be blank, or may, as depicted, include a prompt for a user to input content. Any content may be input into secondary collaborative content item 730, including special objects such as another annotation object 720, which would thus launch a tertiary collaborative content item when selected. The collaborative content management system saves content input into secondary collaborative content item 730, such that, after secondary collaborative content item 730 is closed, when secondary collaborative content item 730 is reopened, secondary collaborative content item 730 includes the content that was input. Multiple users may collaborate in formulating the content in the secondary collaborative content item in the same manner done with respect to a primary collaborative content item.

The collaborative content management system may cause secondary collaborative content item 730 to close when annotation object 720 is again selected. In other words, a selection of annotation object 720 may cause secondary collaborative content item 730 to toggle between being opened and closed. Secondary collaborative content item 730 may alternatively be closed based on a user selection of a close icon (e.g., an "x" icon in a corner of secondary collaborative content item 730) or based on a user selection of any location outside of collaborative content item 730. As content is input into secondary collaborative content item 730, the size of the user interface element depicting secondary collaborative content item 730 may expand, and as content is deleted from secondary collaborative content item 730, the size of the user interface element depicting secondary collaborative content item 730 may contract. In an embodiment, a maximum size of the user interface element including secondary content item 730 may be a default size, and the user interface element may include one or more scrollbars allowing the user to scroll through the content when the content exceeds the maximum size. The collaborative content management system may enable a user to manually expand, contract, pop out, or re-embed a popped out version of the user interface element including secondary collaborative content item 730 based on commands input by the user.

Citations Overview

Figure 8A:
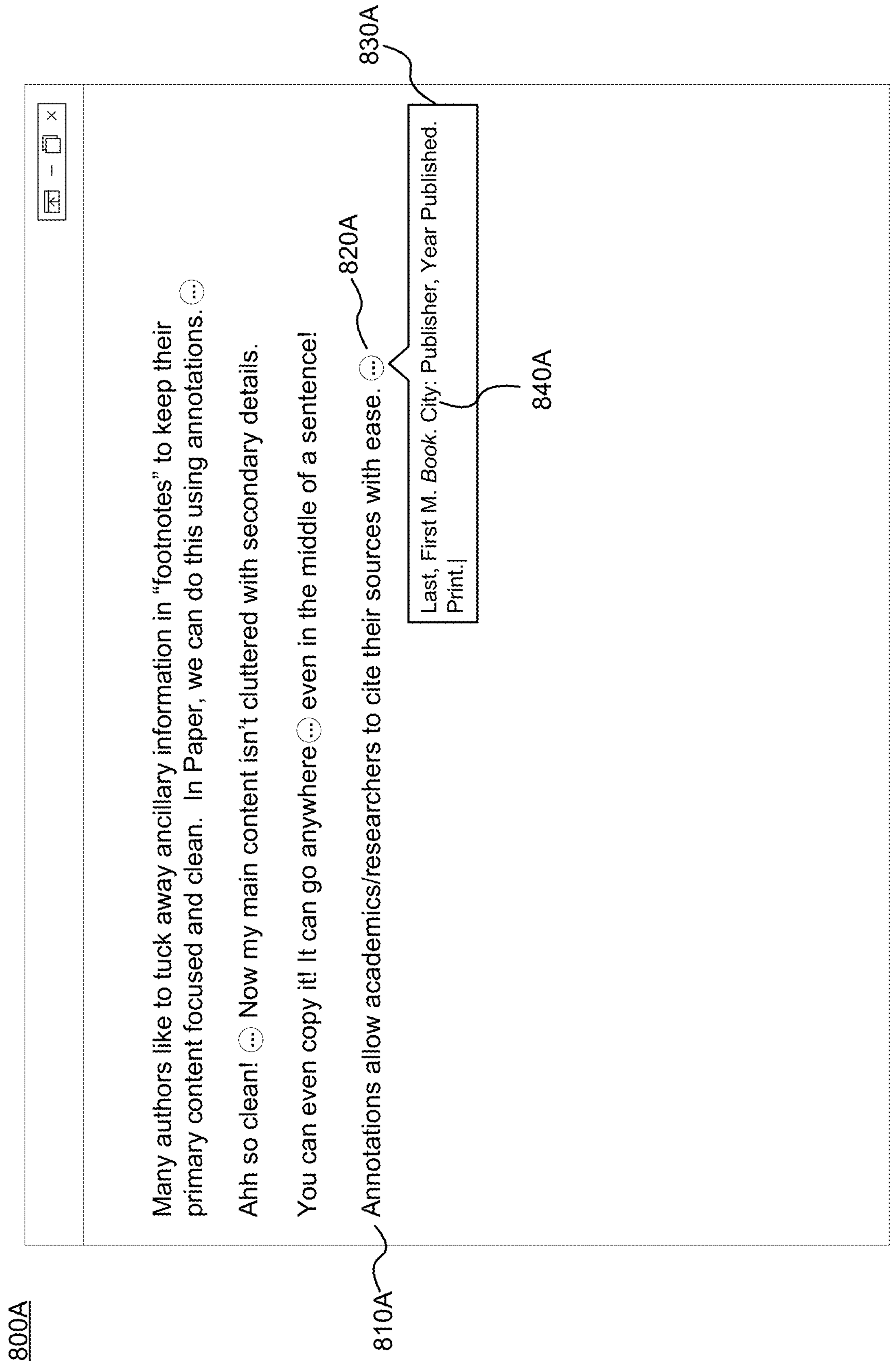
FIG. 8A shows an example collaborative content item including an expanded annotation object with a template for creating a citation within the annotation.

FIG. 8A shows an example collaborative content item including an expanded annotation object with a template for creating a citation within the annotation. Collaborative content item 800A includes collaborative content in line 810A, along with annotation object 820A. When annotation object 820A is selected, secondary collaborative content item 830A is displayed. Each of these items include the full force of description of similarly numbered items in FIGS. 6 and 7. Secondary collaborative content item 830A includes citation template 840A. While citation template 840A is depicted within secondary collaborative content item 830A, citation template 840A may be populated into any collaborative content item in any manner described herein with respect to secondary collaborative content item 830A. Additional annotation objects are depicted in FIG. 8A to illustrate non-exhaustive areas in which annotation objects may be implemented (e.g., between sentences; in the middle of a sentence, etc.).

In an embodiment, the collaborative content management system populates citation template 840A within secondary collaborative content item 830A responsive to receiving a citation command. For example, the collaborative content management system may detect a slash command, such as "/cite," and may responsively determine that citation template 840A is to be populated into secondary collaborative content item 830A. Various commands that correspond to citations may be stored in a database accessible to the collaborative content management system. For example, separate commands may exist for different citation formats. The American Psychological Association (APA) format may have its own command, such as "/APA", where when detected, the collaborative content management system would populate a template corresponding to the APA format, whereas the Modern Language Association (MLA) format may have a different command "/MLA" that causes an MLA format citation template to populate. Slash commands are merely exemplary; any predefined command may be used in their place.

The collaborative content management system may alternatively, or additionally, populate citation template 840A responsive to detecting an attempt by a user in drafting a citation. The collaborative content management system may detect an attempt in drafting a citation based on recognizing a pattern that typically corresponds to a citation attempt. For example, the collaborative content management system may detect that where users add quotation marks around text and insert an annotation object immediately following the quoted text, the user is likely to be adding a citation, and thus may auto-populate a citation template in the secondary collaborative content item corresponding to the annotation object. Any pattern may be detectable, such as a user drafting a name of a book followed by an author, which may be known to collaborative content management system to correspond to a pattern where a book is being cited.

Figure 8B:
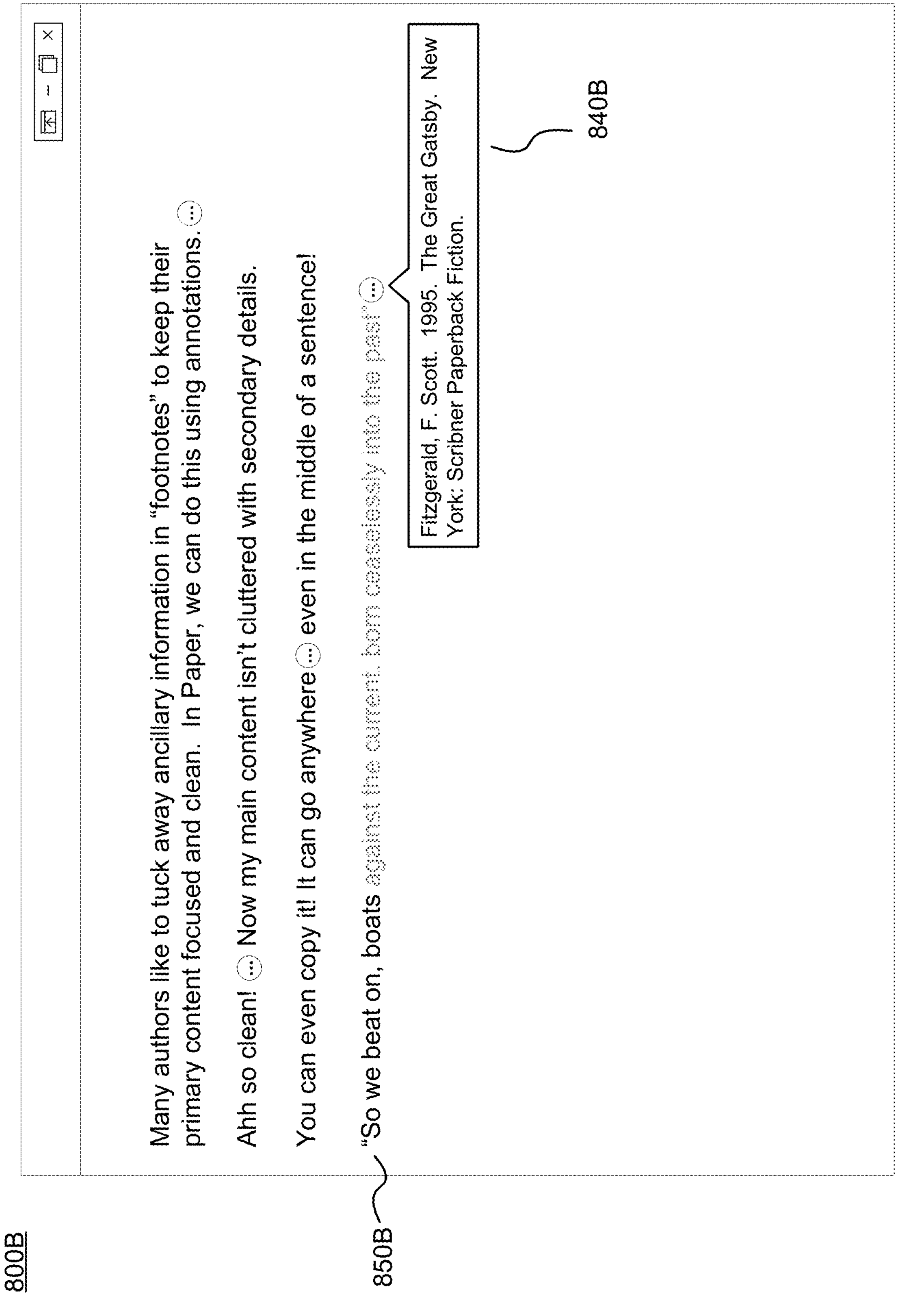
FIG. 8B shows an example collaborative content item including an expanded annotation object with an illustration of an auto-completed quotation.

FIG. 8B shows an example collaborative content item including an expanded annotation object with an illustration of an auto-completed quotation. Quote 850B may be a complete quotation, or a partially drafted quotation, added by a user into collaborative content item 800B. A famous quotation from the novel "The Great Gatsby" is "So we beat on, boats against the current, born ceaselessly into the past." The system may detect this quotation in quote 850B, and may responsively auto-complete citation template 840B to include a citation for "The Great Gatsby," as depicted. As an example, quote 850B may be this full quotation, or it may be a partial quotation of-"And so we beat on, boats —. In an embodiment, the collaborative content management system may detect a partial quotation (e.g., —"So we beat on, boats-), and may responsively detect that the user is attempting to insert the full quotation. The content management system may prompt the user (e.g., using an off-color version of the text, as illustrated in quotation 850B) with an auto-complete option for the quotation. The auto-complete option may be a selectable on-screen option to accept the auto-complete suggestion, or may be accepted by way of a predefined key (e.g., the "tab" key of a keyboard).

Figure 8C:
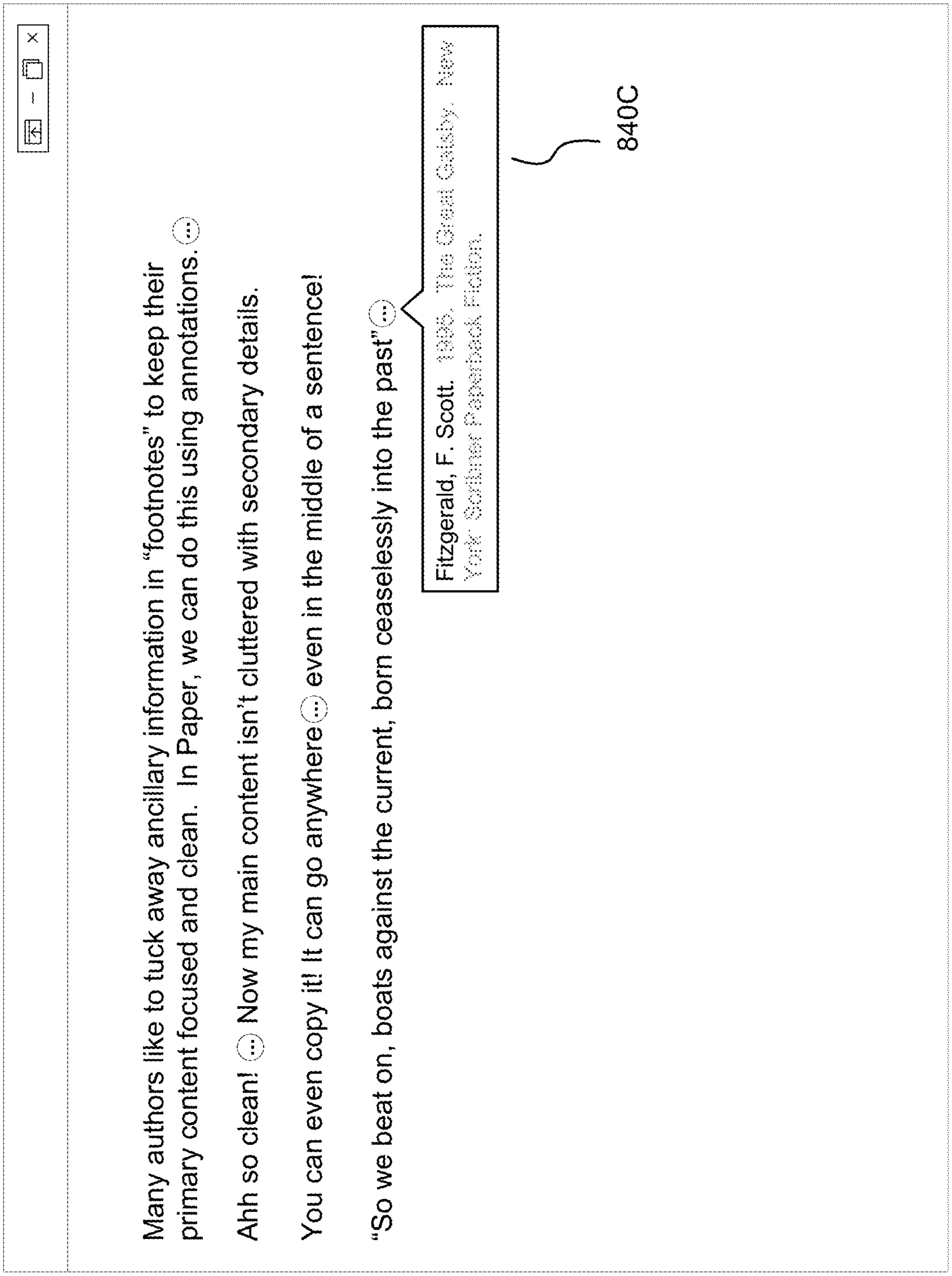
FIG. 8C shows an example collaborative content item including an expanded annotation object with an illustration of an auto-completed citation.

FIG. 8C shows an example collaborative content item including an expanded annotation object with an illustration of an auto-completed citation. The collaborative content management system may determine that a user is attempting to cite the novel "The Great Gatsby." The collaborative content management system may perform this determination by identifying a correspondence between the immediately preceding text (e.g., the depicted quote from "The Great Gatsby"), and text written into citation template 840C of collaborative content item 800C. Responsively, the collaborative content management system may prompt the user with an auto-complete option for the remainder of the citation. As depicted in citation template 840C, the collaborative content management system may use off-color text with an auto-complete option to accept the off-color text as the complete citation.

Turning back to FIG. 8A, in an embodiment, rather than automatically populating a citation template, the collaborative content management system may prompt the user with a selectable option to populate a citation template. For example, the prompt may state "It seems you are drafting a citation, would you like assistance with this?" In an embodiment, further selectable options may be accessible to the user via the prompt to select one or more parameters for the citation (e.g., whether it is a book or a magazine that is being cited; whether the user prefers to use MLA or ALA format, etc.). Alternate user interfaces, such as menus, drop-downs, etc., may be used to select parameters such as citation formats, font, etc. The system may determine that the user is likely citing to one of a few format types, and may prompt the user to clarify the format type the user is using. For example, the collaborative content management system may determine that the user is either citing a book or a magazine, and may prompt the user to confirm which of book or magazine the user is citing. Books and magazines are merely exemplary, any type of source may be determined to be a possibility, such as peer-reviewed journals, webpages, etc.

Citation template 840A includes a variety of fields that correspond to the citation to be made. The user may select a given field and populate information. In an embodiment, the collaborative content management system may determine formatting that corresponds to a given field, such as a title needing to be italicized or underlined in the format being used. The collaborative content management system may automatically underline, italicize, capitalize, or otherwise format text as it is entered to comply with the format.

Figure 8D:
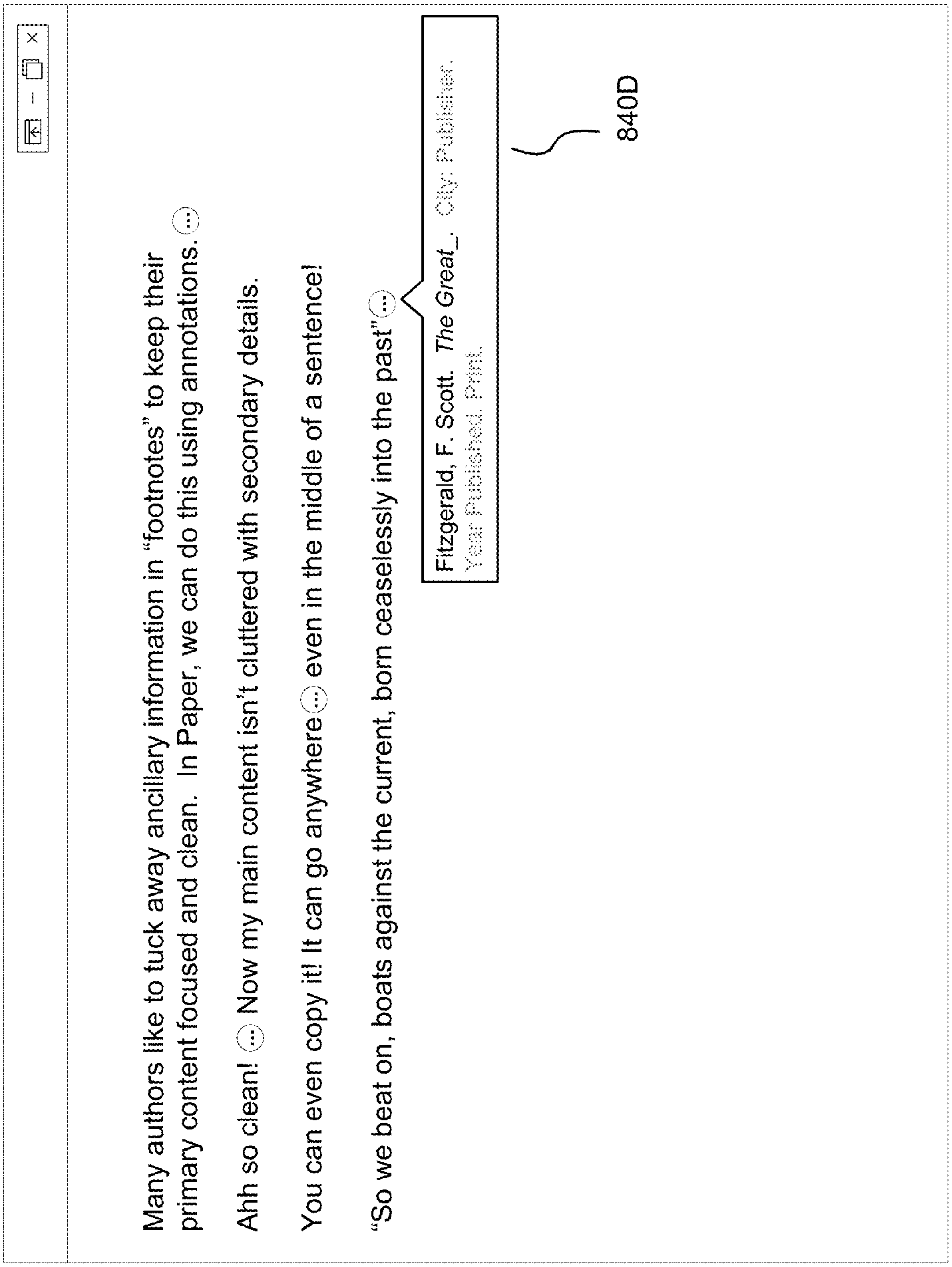
FIG. 8D shows an example collaborative content item including an expanded annotation object with an illustration of a citation that is auto-formatted as it is input.

FIG. 8D shows an example collaborative content item including an expanded annotation object with an illustration of a citation that is auto-formatted as it is input. As a user fills in different fields of citation template 840D of collaborative content item 800D, proper formatting is applied. For example, the title of the novel "The Great Gatsby" is to be italicized to follow proper format, and thus, while the user did not select italicized text, the words "The Great" are automatically italicized by the collaborative content management system as the text is entered into the "title" field of citation template 840D.

Further, in an embodiment, the collaborative content management system may determine, as text is entered, whether it can identify the source being cited, and responsive to determining that it can identify the source being cited, the collaborative content management system may complete the citation, or offer a suggested completion to the user that may be selected by the user. Yet further, in an embodiment, the collaborative content management system may identify a web location from where the document may be retrieved (either for purchase or for free), and may populate a link (e.g., hyperlink) to the web location within either the template or its corresponding secondary collaborative content item.

Rather than insert citation template 840A into the secondary collaborative content item in the manners described above, the collaborative content management system may insert a complete citation. Collaborative content management system may detect a pattern corresponding to a citation, and may automatically format and insert the citation without use of a citation template. A hyperlink to a web location of what is being cited may be included in accordance with the foregoing. In an embodiment, the collaborative content management system may detect the attempt to format the citation as described above and may compare information in the attempt (e.g., a name of a book, an author, and/or additional information typed into the attempt) to information of entries in a database to determine the content that the user is attempting to cite. Responsive to finding a match, the collaborative content management system may auto-generate annotation object 820A, and may automatically insert a citation into its corresponding secondary collaborative content item 830A. Responsive to finding two or more matches, the collaborative content management system may prompt the user to select which of the potentially matching citations matches the user's intent. Alternatively, responsive to finding two or more matches, the collaborative content management system may compare text preceding the citation attempt to the text in each potential match to determine which potential match is accurate, and if one is determined to be accurate, its corresponding citation is used.

The collaborative content management system may determine a citation format that the user prefers, and automatically apply that citation format in future citations by default. The collaborative content management system may determine the preferred citation format through explicit feedback by querying the user for a preferred citation format. Alternatively, the collaborative content management system may determine the preferred citation format through implicit feedback, by determining that the user tends to select a particular format for citations. The preferred citation format may be used for auto-populated citations, and/or for citation templates. In an embodiment, a user may hotkey or otherwise shortcut a citation, and when the shortcut is used, the citation can be automatically populated into an annotation object where the user is presently cursored in the collaborative content item.

The collaborative content management system may detect that a citation is appropriate where a user has omitted a citation. For example, the collaborative content management system may detect quoted text in collaborative content item 800A where no citation follows. In an embodiment, the collaborative content management system may responsively prompt the user querying the user as to whether the user would like to add a citation. In another embodiment, the collaborative content management system may automatically add a citation, either directly, or within a secondary collaborative content item 830A corresponding to an annotation object 820A. The collaborative content management system may determine what to cite in such a citation based on what the user has previously cited. For example, if the user previously cited twenty different sources, the collaborative content item may compare the quoted text to the text of each of the twenty different sources, and responsive to finding a match, may cite the matching source. A match to quoted text may be found using fuzzy logic to find quoted text where a perfect match is not found (e.g., due to a typographical error made by the user in typing up the quoted text). Where a perfect match is not found, the collaborative content management system may autocorrect the quote, or may prompt the user with an alert that the quote does not exactly match what the user is attempting to quote, the prompt including a selectable option to correct the quoted text. Moreover, where the collaborative content management system determines that a partial quote has been entered by the user, the collaborative content management system may autocomplete the quote, or may propose text that, if accepted, is automatically included in the collaborative content item. Responsive to not finding a match, the collaborative content management system may prompt the user to provide identifying information of the source so that a citation can be created. Alternatively, responsive to not finding a match, the collaborative content management system may compare the quoted text to text of a library of potential sources to identify a match, and may cite a matching source if one is found. Rather than limiting the initial comparison to previously cited sources, the collaborative content management system may perform the initial comparison against the larger library.

In an embodiment, the collaborative content management system may determine that collaborative content item 800A is designated for use within a certain domain only, such as an internal company document. The collaborative content management system may identify a database of content items that are also designated for use within that domain. As content is added to collaborative content item 800A, the collaborative content management system may compare the content to the content items in the database and may identify a match, or a partial match. The collaborative content system may recommend that credit be given to the matching document. This would facilitate, for example, intra-company content credit being given to other internal articles within the company.

In an embodiment, the collaborative content management system may detect that the user wishes to export the collaborative content item to another format, or wishes to print the collaborative content item to a hard copy. Rather than include annotation objects in an environment that does not natively support annotation objects, the collaborative content management system may move the content. In an embodiment, the collaborative content management system may move the content from each annotation object to footnotes, replacing each annotation object with a reference numeral corresponding to its respective footnote. Alternatively, or additionally, the collaborative content management system may identify citations in each secondary collaborative content item and may generate a bibliography to be appended to the front or back of the main text of the collaborative content item. The collaborative content management system may prompt the user to select whether the user prefers footnotes, bibliography, or both.

Figure 9:
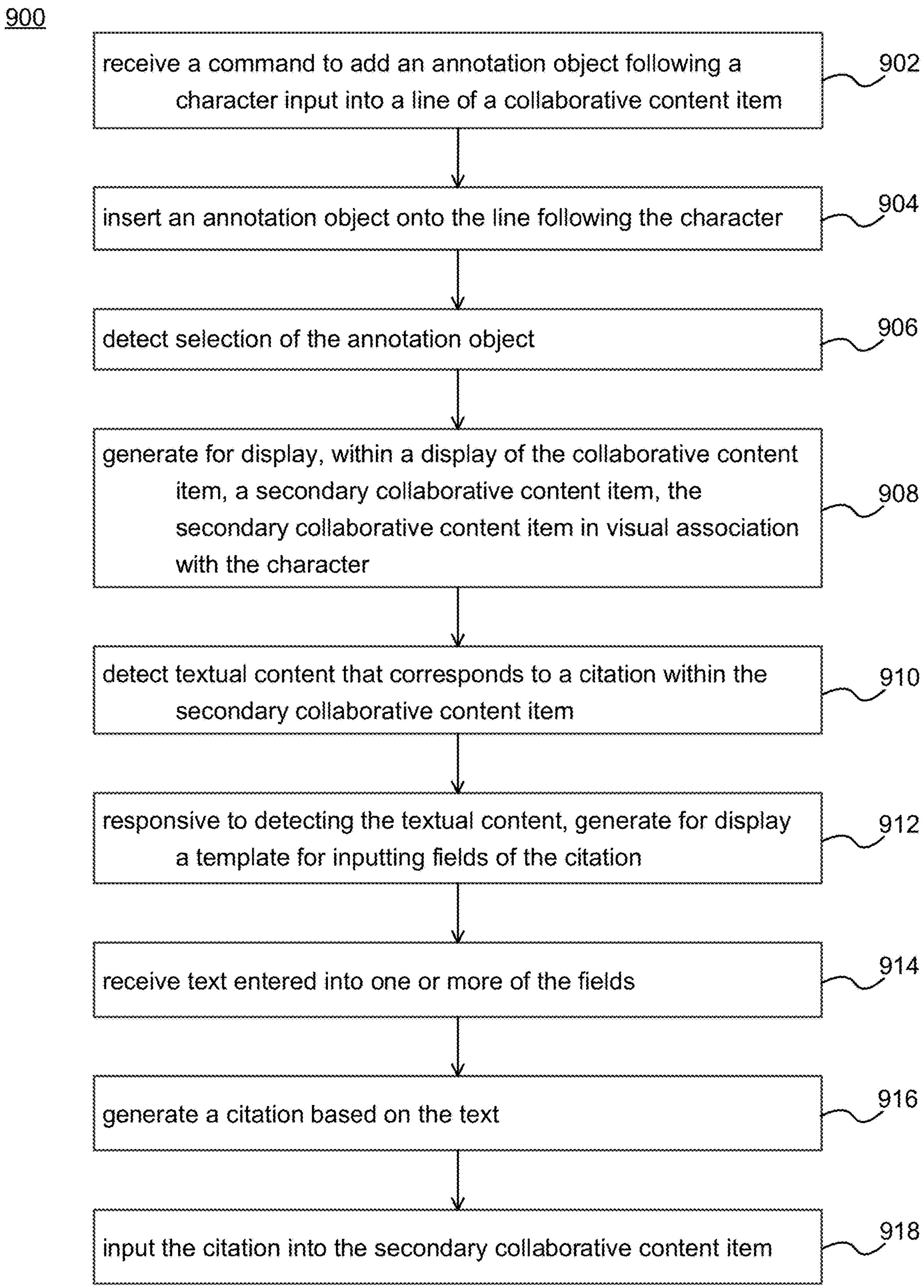
FIG. 9 shows an exemplary flowchart of a process for generating an annotation object including a citation in a collaborative content item by using a template.

FIG. 9 shows an exemplary flowchart of a process for generating an annotation object including a citation in a collaborative content item by using a template. Process 900 begins with the collaborative content management system (e.g., collaborative content management system 130) receiving 902 a command to add an annotation object (e.g., annotation object 820A) following a character input into a line of a collaborative content item (e.g., line 810A of collaborative content item 800A). The collaborative content management system inserts 904 an annotation object (e.g., annotation object 820A) onto the line (e.g., line 810A) following the character. The collaborative content management system detects 906 selection of the annotation object (e.g., a user clicking a mouse when a cursor is on top of the annotation object).

The collaborative content management system generates for display 908, within a display of the collaborative content item, a secondary collaborative content item (e.g., secondary collaborative content item 830A), the secondary collaborative content item in visual association with the character (e.g., displayed above, below, or obscuring the character). The collaborative content management system detects 910 textual content that corresponds to a citation within the secondary collaborative content item. For example, a pattern corresponding to a citation is detected, or a slash command is detected.

Responsive to detecting the textual content, the collaborative content management system generates for display 912 a template for inputting fields of a citation (e.g., citation template 840A). The collaborative content management system receives 914 text entered into one or more of the fields (e.g., a specification of author, title, etc.). The collaborative content management system then generates 916 a citation based on the text, and inputs 918 the citation onto the secondary collaborative content item.

Figure 10:
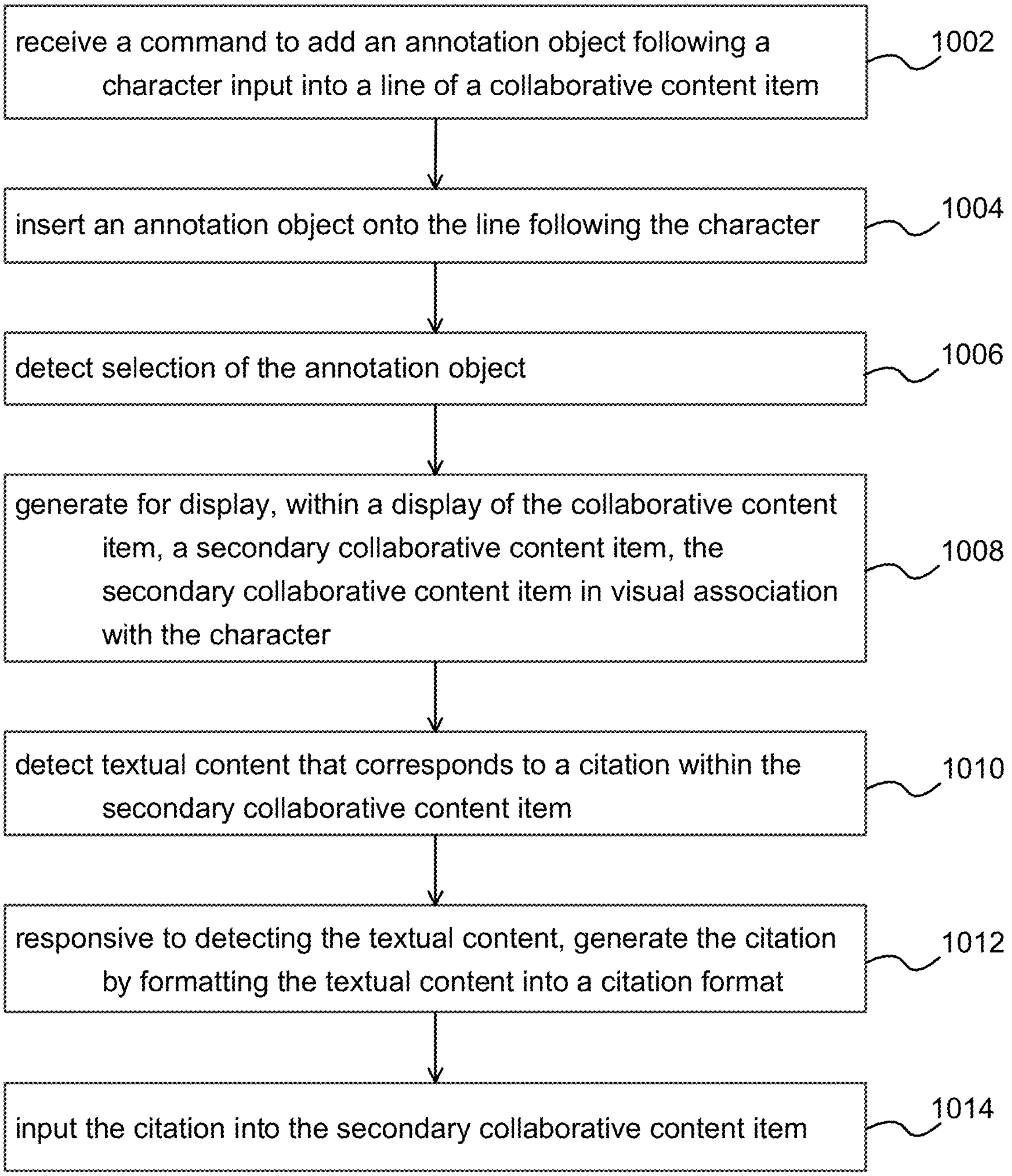
FIG. 10 shows an exemplary flowchart of a process for generating an annotation object including a citation in a collaborative content item by automatically formatting the citation.

FIG. 10 shows an exemplary flowchart of a process for generating an annotation object including a citation in a collaborative content item by automatically formatting the citation. Process 1000 begins with the collaborative content management system (e.g., collaborative content management system 130) receiving 1002 a command to add an annotation object following a character input into a line of a collaborative content item (e.g., a command to add annotation object 720 to line 710 of collaborative content item 700). The collaborative content management system inserts 1004 an annotation object onto the line following the character (e.g., inserting annotation object 720 into collaborative content item 700).

The collaborative content management system detects 1006 selection of the annotation object (e.g., a user clicking a mouse while hovering a cursor over annotation object 720). The collaborative content management system generates for display 1008, within a display of the collaborative content item (e.g., collaborative content item 700), a secondary collaborative content item (e.g., secondary collaborative content item 730), the secondary collaborative content item being in visual association with the character.

The collaborative content management system detects 1010 content that corresponds to a citation within the secondary collaborative content item (e.g., an attempted citation). Responsive to detecting the textual content, the collaborative content management system generates 1012 the citation by formatting the textual content into a citation format (e.g., a user-preferred citation format, such as ALA). The collaborative content management system inputs 1014 the citation into the secondary collaborative content item.

Additional Considerations

The systems and methods described herein, among other things, achieve an advantage of an improved user interface, in that the annotation objects described herein improve display area utilization. By use of annotation objects, auxiliary content can be embedded in-line with text and other objects of a collaborative content item in a manner that neither clutters the collaborative content item, nor requires diversion of a user's attention away from the user's area of focus. Moreover, while embedded in-line, the ability to toggle secondary collaborative content items signified by annotation objects ensures that the annotation objects keep auxiliary content accessible, while hidden when unneeded.

Reference in the specification to "one embodiment" or to "example embodiments" means that a particular feature, structure, or characteristic described in connection with the example embodiments is included in at least one embodiment. The appearances of the phrase "in one embodiment" in various places in the specification are not necessarily all referring to the same embodiment.

In this description, the term "module" refers to a physical computer structure of computational logic for providing the specified functionality. A module can be implemented in hardware, firmware, and/or software. In regards to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. It will be understood that any computer programming language may support equivalent structures using a different terminology than "module."

It will be understood that the named modules described herein represent one embodiment of such modules, and other example embodiments may include other modules. In addition, other example embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including optical disks, CD-ROMs, read-only memories (ROMs), random access memories (RAMs), magnetic or optical cards, or any type of media suitable for storing electronic instructions, and each coupled to a computer system bus. Furthermore, the computers referred to in the specification may include a single processor or may be architectures employing multiple processor designs for increased computing capability.

The algorithms presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present technology is not described with reference to any particular programming language. It will be appreciated that a variety of programming languages may be used to implement the teachings of the present technology as described herein, and any references above to specific languages are provided for disclosure of enablement and best mode of the present technology.

While the technology has been particularly shown and described with reference to a preferred embodiment and several alternate example embodiments, it will be understood by persons skilled in the relevant art that various changes in form and details can be made therein without departing from the spirit and scope of the technology.

As used herein, the word "or" refers to any possible permutation of a set of items. Moreover, claim language reciting 'at least one of' an element or another element refers to any possible permutation of the set of elements.

Although this description includes a variety of examples and other information to explain aspects within the scope of the appended claims, no limitation of the claims should be implied based on particular features or arrangements these examples. This disclosure includes specific example embodiments and implementations for illustration, but various modifications can be made without deviating from the scope of the example embodiments and implementations. For example, functionality can be distributed differently or performed in components other than those identified herein. This disclosure includes the described features as non-exclusive examples of systems components, physical and logical structures, and methods within its scope.

Finally, it should be noted that the language used in the specification has been principally selected for readability and instructional purposes, and may not have been selected to delineate or circumscribe the inventive subject matter. Accordingly, the disclosure of the present technology is intended to be illustrative, but not limiting, of the scope of the technology, which is set forth in the following claims.

What is claimed is:

1. A method comprising:
- receiving a command to add an annotation object adjacent to a character input into a collaborative content item;
- responsive to receiving the command from the user, inserting an annotation object adjacent to the character;
- detecting selection of the annotation object; and
- responsive to detecting the selection of the annotation object, accessing a secondary collaborative content item from a collaborative content management system server and generating for display, within a display of the collaborative content item and in visual association with the character, a template for inputting fields of a citation within the secondary collaborative content item.

2. The method of claim 1, wherein generating for display the template occurs responsive to detecting the selection of the annotation object, and wherein the secondary collaborative content item is displayed in visual association with the character based on the secondary collaborative content item expanding over the character when displayed.

3. The method of claim 1, wherein the template is displayed further responsive to detecting a command that is predefined as corresponding to citation generation.

4. The method of claim 1, wherein the template is displayed further responsive to detecting a sequence of characters that matches a known pattern.

5. The method of claim 1, further comprising:
- determining a plurality of candidate citation types associated with textual content input into the secondary collaborative content item;
- generating for display a prompt including a selectable option for each of the candidate citation types;
- receiving a selection of a respective selectable option for a respective one of the candidate citation types; and
- selecting the template based on the selected respective one of the candidate citation types.

6. The method of claim 1, further comprising:
- detecting additional textual content that corresponds to the citation within the collaborative content item; and
- auto-populating an additional citation into a further secondary collaborative content item without requiring entry of data into an additional template.

7. The method of claim 1, further comprising:
- detecting quoted subject matter in the collaborative content item;
- determining a source of the quoted subject matter;
- generating a quote citation for the quoted subject matter based on the source; and
- embedding an additional annotation object comprising the quote citation adjacent to the quoted subject matter.

8. The method of claim 1, further comprising:
- scraping each citation from the collaborative content item; and
- generating, using the scraped citations, a bibliography.

9. A method comprising:
- receiving a command from a user to add an annotation object into a collaborative content item;
- responsive to receiving the command from the user, inserting an annotation object into the collaborative content item;
- responsive to detecting the selection of the annotation object, accessing a secondary collaborative content item from a collaborative content management system server and generating for display, within a display of the collaborative content item, the secondary collaborative content item in visual association with the annotation object;
- detecting textual content within the secondary collaborative content item; and
- responsive to detecting the textual content, automatically reformatting the textual content into a citation format.

10. The method of claim 9, wherein generating for display the secondary collaborative content item occurs responsive to detecting the selection of the annotation object, and wherein the secondary collaborative content item is in visual association with the character based on the secondary collaborative content item expanding over the character when displayed.

11. The method of claim 9, wherein detecting the textual content comprises detecting a sequence of characters that matches a known pattern.

12. The method of claim 9, further comprising, further responsive to detecting the textual content:
- determining a citation style preferred by a user who input the textual content; and
- automatically generating a citation by using the citation style as the citation format when automatically reformatting the textual content.

13. The method of claim 9, further comprising:
- detecting quoted subject matter in the collaborative content item;
- determining a source of the quoted subject matter;
- generating a quote citation for the quoted subject matter based on the source; and
- embedding an additional annotation comprising the quote citation adjacent to the quoted subject matter.

14. The method of claim 9, further comprising:

scraping each citation from the collaborative content item; and generating, using the scraped citations, a bibliography.

15. A non-transitory computer-readable storage medium storing executable computer instructions that, when executed by one or more processors, cause the one or more processors to perform steps comprising:

receiving a command from a user to add an annotation object into a line of a collaborative content item;

responsive to receiving the command from the user, inserting an annotation object onto the line of the collaborative content item;

detecting selection of the annotation object;

responsive to detecting the selection of the annotation object, accessing a secondary collaborative content item from a collaborative content management system server and generating for display, within a display of the collaborative content item, the secondary collaborative content item, the secondary collaborative content item in visual association with the annotation object;

detecting textual content provided by the user within the secondary collaborative content item; and responsive to detecting the textual content, automatically reformatting the textual content according to a predefined template.

16. The non-transitory computer-readable storage medium of claim 15, wherein generating for display the secondary collaborative content item occurs responsive to detecting the selection of the annotation object, and wherein the secondary collaborative content item is in visual association with the character based on the secondary collaborative content item expanding over the character when displayed.

17. The non-transitory computer-readable storage medium of claim 15, further comprising performing the automatic reformatting of the textual content further responsive to detecting a command that is predefined as corresponding to citation generation.

18. The non-transitory computer-readable storage medium of claim 15, further comprising identifying the predefined template based on detecting a sequence of characters that matches a known pattern.

19. The non-transitory computer-readable storage medium of claim 15, the steps further comprising, further responsive to detecting the textual content:

determining a plurality of candidate citation types associated with the textual content;

generating for display a prompt including a selectable option for each of the candidate citation types;

receiving a selection of a respective selectable option for a respective one of the candidate citation types; and selecting the template based on the selected respective one of the candidate citation types.

20. The non-transitory computer-readable storage medium of claim 15, the steps further comprising:

detecting additional textual content that corresponds to the citation; and auto-populating an additional citation without requiring entry of data into an additional template.

* * * * *